United States Patent
Barry et al.

(10) Patent No.: US 10,328,997 B2
(45) Date of Patent: Jun. 25, 2019

(54) SUBSURFACE SEISMIC DEPLOYMENT SYSTEM AND METHOD

(71) Applicant: ION Geophysical Corporation, Houston, TX (US)

(72) Inventors: Ronald Barry, Houston, TX (US); André W. Olivier, River Ridge, LA (US); Curt Schneider, Houston, TX (US)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 15/604,268

(22) Filed: May 24, 2017

(65) Prior Publication Data

US 2017/0341714 A1    Nov. 30, 2017

Related U.S. Application Data

(60) Provisional application No. 62/340,890, filed on May 24, 2016.

(51) Int. Cl.
    *G01V 1/20*    (2006.01)
    *G01V 1/38*    (2006.01)
    *B63B 21/66*   (2006.01)

(52) U.S. Cl.
    CPC ............. *B63B 21/66* (2013.01); *G01V 1/201* (2013.01); *G01V 1/3826* (2013.01); *G01V 1/3852* (2013.01); *B63B 2211/02* (2013.01)

(58) Field of Classification Search
    CPC ... B63B 21/66; B63B 2211/02; G01V 1/3852; G01V 1/3826; G01V 1/201

USPC ......................................................... 367/15
See application file for complete search history.

(56) References Cited

U.S. PATENT DOCUMENTS

| 6,350,085 B1 | 2/2002 | Bath et al. |
| 8,579,545 B2 | 11/2013 | Jewell et al. |
| 2005/0276665 A1 | 12/2005 | Entralgo et al. |
| 2006/0159524 A1 | 7/2006 | Thompson et al. |
| 2007/0248417 A1 | 10/2007 | Berg |
| 2011/0217123 A1 | 9/2011 | Jewell et al. |

(Continued)

FOREIGN PATENT DOCUMENTS

| EP | 2712802 A1 | 4/2014 |
| FR | 2611917 A1 | 9/1988 |

(Continued)

OTHER PUBLICATIONS

International Search Report and Written Opinion dated Jul. 21, 2017 in connection with International Patent Application No. PCT/US2017/034272, 18 pages.

(Continued)

*Primary Examiner* — Daniel L Murphy
(74) *Attorney, Agent, or Firm* — Dorsey & Whitney LLP

(57) ABSTRACT

A seismic deployment system having a deployment apparatus, a tow line, and a carrier line having a plurality of seismic sensor coupled therealong. The deployment apparatus has a hydrodynamic body. The tow line is configured for towing the hydrodynamic body through a water column. The carrier line is engaged with the deployment apparatus. The deployment apparatus is configured to control tension in the carrier line for deployment of the seismic sensors while the hydrodynamic body is towed through the water column by the tow line.

25 Claims, 18 Drawing Sheets

(56) References Cited

U.S. PATENT DOCUMENTS

| | | | |
|---|---|---|---|
| 2012/0134752 A1 | 5/2012 | Eisenhower et al. | |
| 2013/0155806 A1* | 6/2013 | Brizard | G01V 1/3817 367/16 |
| 2014/0247691 A1 | 9/2014 | Martin | |

FOREIGN PATENT DOCUMENTS

| | | | |
|---|---|---|---|
| GB | 2470784 | A | 12/2010 |
| WO | 9218377 | A1 | 10/1992 |
| WO | 2008105667 | A1 | 9/2008 |
| WO | 2009026002 | A1 | 2/2009 |
| WO | 2014090811 | A2 | 6/2014 |
| WO | 2014093292 | A1 | 6/2014 |
| WO | 2015034368 | A1 | 3/2015 |
| WO | 2016064280 | A1 | 4/2016 |

OTHER PUBLICATIONS

Hodge, Mike. "Infilling 4C ocean bottom cable surveys," Offshore, Sep. 1, 2004, 6 pages, obtained from <http://www.offshore-mag.com/articles/print/volume-64/issue-9/geology-geophysics/infilling-4c-ocean-bottom-cable-surveys.html>.

Forland, Willy, "Position-Best-Determination by Seafloor Seismic," Geodesy—OG Hydrography Today, Nov. 4, 2004, 25 pages.

* cited by examiner

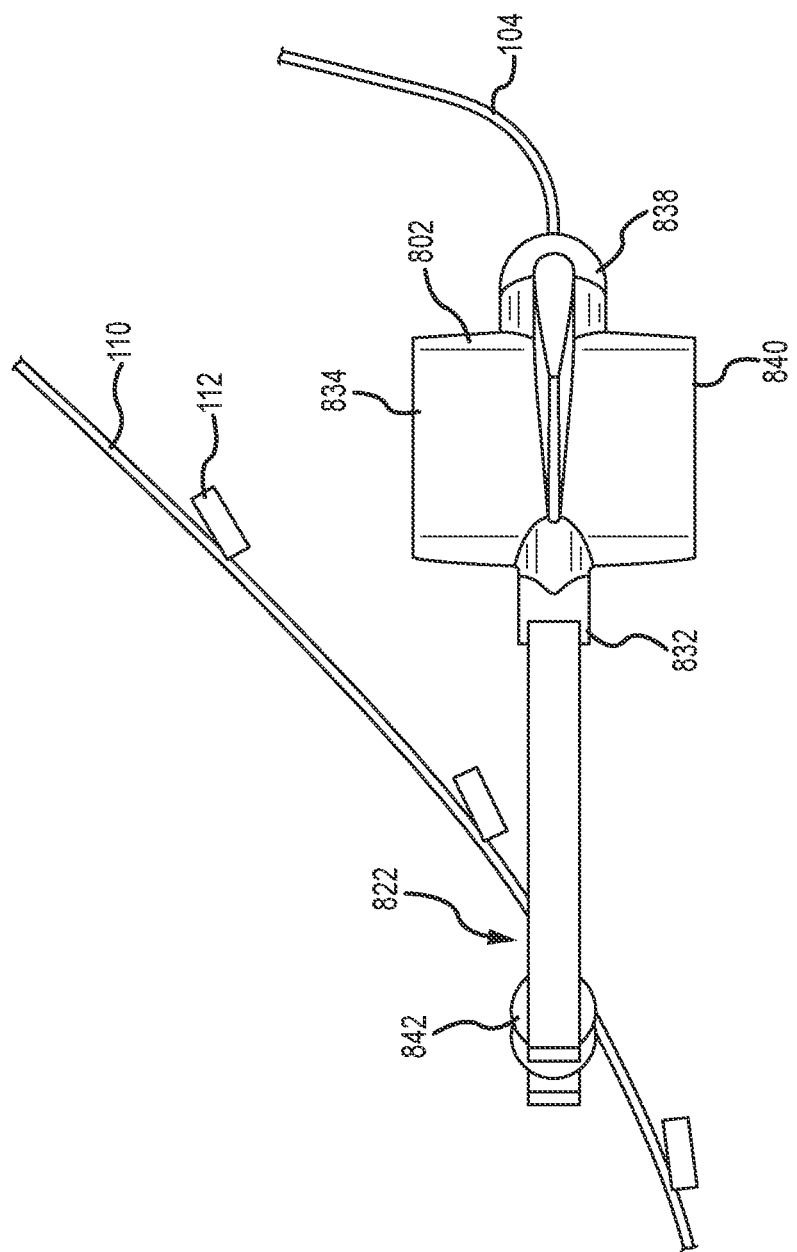

SUBSURFACE SEISMIC DEPLOYMENT SYSTEM AND METHOD

CROSS-REFERENCE TO RELATED APPLICATIONS

This application claims priority to U.S. Provisional Application No. 62/340,890, SUBSURFACE SEISMIC DEPLOYMENT SYSTEM AND METHOD, filed May 24, 2016, which is incorporated by reference herein, in the entirety and for all purposes.

FIELD

This application relates generally to seismic data acquisition, and more specifically to deploying and positioning ocean bottom or deep towed seismic data acquisition systems. Suitable applications include, but are not limited to, towed seismic streamer arrays, ocean-bottom cables, and arrays of autonomous seismic sensor nodes.

BACKGROUND

Marine seismic exploration is traditionally conducted by firing an acoustic source which generates a collapsing air bubble. The collapse of the bubble generates acoustic pulses that propagate through the water and into the earth. By analyzing the reflected seismic wave field detected by the receiver(s) during the survey, the geophysical data pertaining to reflected signals may be acquired and these signals may be used to form an image indicating the composition of the Earth near the survey location. The seismic wave field within the water column can transmit pressure waves (P-waves) while a wave field on the ocean bottom can transmit both P-waves and shear waves (S-waves), in addition to more complex wave fields.

Two basic methods are used to record these wave fields. Within the water column and near the surface a network of hydrophones can be towed behind a seismic vessel, in proximity of a sound source. Towed array seismic data acquisition systems can be models of productivity, and the density and network of sensors can be configured to collect vast amounts of seismic data while towing at speeds up to six knots. Towed array seismic surveys can also be significantly less expensive than competing technologies such as ocean bottom cables and nodal systems. The data quality, however, may be somewhat less relative to "stationary" acquisition methods, as acoustic noise is generated when the streamers are towed. The lack of S-wave detection can also be a limitation on imaging capability.

Cable based ocean bottom seismic systems such as those disclosed in U.S. Pat. Nos. 6,775,203 and 8,446,797, each of which is incorporated by reference herein, exemplify some embodiments of cable based ocean bottom systems. These seismic acquisition systems serially deploy dual sensor packages having hydrophones and particle motion sensors such as geophones or accelerometers to the ocean floor. Power and telemetry are supplied via electrical and optical conductors with sensor stations serially and coaxially connected at periodic intervals of 25 to 50 meters.

Ocean bottom seismic acquisition system(s) available from ION Geophysical Corporation of Houston, Tex. are capable of operating in up to 2,000 meters of water. In order to reliably deploy and recover the system the electrical conductors are overwound with a steel armor package. The armor package, typically steel, can be deployed accurately and rapidly. Maximum deployment speed is limited by the free fall velocity of the system, determined by the difference in specific gravity of the system and seawater. Armor based systems may take up to 30 minutes to descend 2,000 meters. Consequently the surface deployment vessel speed is dependent on the system free fall decent time. As steel is significantly heavier than sea water there is a maximum depth achievable relative to the tensile strength of the armor package. Steel wire systems are depth limited as the addition of more steel simply increases tensile loads. Armor based cables offer fast and accurate positioning but suffer reliability issues due to the complexity of the power and telemetry requirements.

Nodal systems are autonomous seismic recorders which are deployed and recovered by remotely operated vehicles (ROV) or by a carrier line. Each node has a battery and recording system eliminating the requirement for a heavy power and telemetry system. Instead light weight synthetic ropes are used to deploy and retrieve nodal systems. The depth of the seismic survey is now limited to the node survivability and deployment techniques as the density of the carrier line is similar to sea water. The impact on deployment rate and positioning accuracy is a significant shortcoming of using a light weight carrier line as the carrier line specific gravity is close to sea water. Deployment speed is significantly impacted as it may take up to 1 hour for the system to descend to 2,000 m.

Near the surface cross currents significantly impact touch down accuracy in deep water. Currents near the ocean bottom however are usually insignificant. Retrieval of the near neutrally buoyant system is advantageous during the recovery operation as winching loads are significantly less than armor based ocean bottom systems. Needed is a deployment solution that transitions near surface high currents while rapidly deploying nodes in deep water.

SUMMARY

A seismic receiver deployment system can comprise one or more of a deployment apparatus having a hydrodynamic body, a tow line configured for towing the hydrodynamic body through a water column, and a carrier line engaged with the deployment apparatus, the carrier line having a plurality of seismic sensors coupled therealong. The deployment apparatus can be configured to control tension in the carrier line for deployment of the seismic sensors while the hydrodynamic body is towed through the water column by the tow line.

In various embodiments, such a system can comprise a tow line connected to a sub-surface towed vessel or sheave component. The sub-surface component can have at least one surface or apparatus for redirecting a carrier line, e.g., a deployment carrier line with a single or a plurality of seismic nodes attached to the carrier line. The sub-surface component can be configured to redirect the carrier line while towed from a substantially vertical orientation to substantially horizontal, and to contact the ocean floor.

The ocean bottom acquisition system can be deployed at rates substantially faster than free fall velocities (in water) using tension, and can be positioned directly behind or laterally offset from the tow vessel centerline. The ocean bottom acquisition system can be retrieved via the same or similar techniques.

The carrier line tension can be controlled by the sub-surface vessel or sheave system, which is capable of communicating with the ocean bottom node. Alternatively, the carrier line tension can be controlled by the surface vessel.

BRIEF DESCRIPTION OF THE DRAWINGS

FIG. 12B is a side view of the deployment apparatus of FIG. 12A.

DETAILED DESCRIPTION

Figure 1:
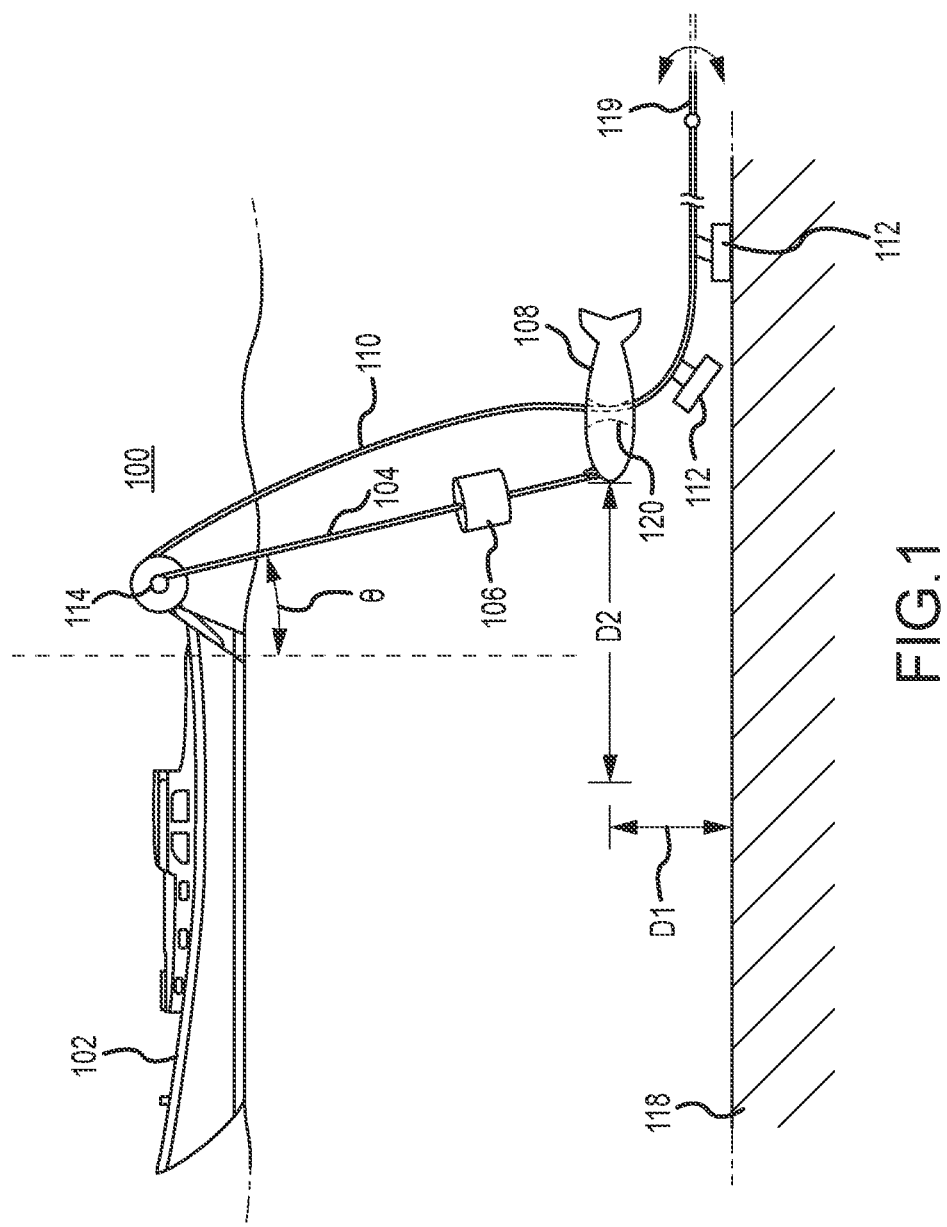
FIG. 1 is a schematic representation of a seismic vessel employing a sub-sea deployment system, according to an embodiment.

FIG. 1 is schematic representation of a seismic vessel 102 employing a sub-sea deployment system 100, according to an embodiment. Seismic receivers or nodes 112 are deployed from the seismic vessel 102 by way of a carrier line 110. In order to improve deployment rate and positioning accuracy, the sub-sea deployment system 100 includes a deployment apparatus 108 that is towed behind the vessel 102 by a tow line 104. The mass and drag properties of the tow line 104 and sub-surface deployment apparatus 108 are selected such that when towed at the target survey speed (e.g., five knots or more), the depth of sub-surface deployment apparatus 108 above the ocean floor D1 and the setback D2 from the vessel 102 are deterministic.

Various different configurations of the deployment apparatus 108 are adapted for improved deployment of seismic receivers or nodes 112. For example, the deployment apparatus 108 can be configured as a sub-surface sheave system adapted to control tension in carrier line 110 during node deployment. The deployment apparatus 108 can also be provided in the form of a submersible vessel adapted to include such a sheave system, e.g., a remotely operated or unmanned (autonomous) underwater vessel with an on-board sheave system, or a foil-shaped hydrodynamic body with an on-board sheave device. In each of these embodiments, the deployment apparatus 108 can also be configured to provide active ballasting properties, including, but not limited to, variable ballasting systems adapted to allow active adjustment of the depth of deployment apparatus 108, during node deployment and other operations.

The deployment apparatus 108 includes at least one surface 120 that contacts the carrier line 110 as the nodes 112 are deployed on or near the ocean floor 118. The carrier line 110 is anchored to the bottom floor via anchor 119. As the tension on the tow line 104 acts to stabilize the deployment apparatus 108, the interaction of the carrier line 110 with the at least one surface 120 of the deployment apparatus 108 provides controlled deployment rate and positioning accuracy as the nodes 112 are deployed on or near the ocean floor 118. For example, the deployment apparatus 108 may redirect the nodes 112 from a substantially vertical orientation to a substantially horizontal orientation with improved speed and accuracy.

In some embodiments, the system is configured to provide high tension of the carrier line 110 on one side of the deployment apparatus 108 and low tension of the carrier line on another side the deployment apparatus 108. For example, the deployment apparatus 108 can be configured so that the tension in the carrier line 110 is greater on one side of the apparatus (e.g., between the deployment apparatus 108 and the vessel) than the tension in the carrier line 110 on the other side of the apparatus (e.g., below the deployment apparatus 108, or on the side opposite the vessel). The surfaces 120 of the deployment apparatus 108 can also be configured to help control the change in tension in the carrier line 110, even where the speed of the node through the water column may be the same above and below (or on either side of) the sheave device.

Figure 2A:
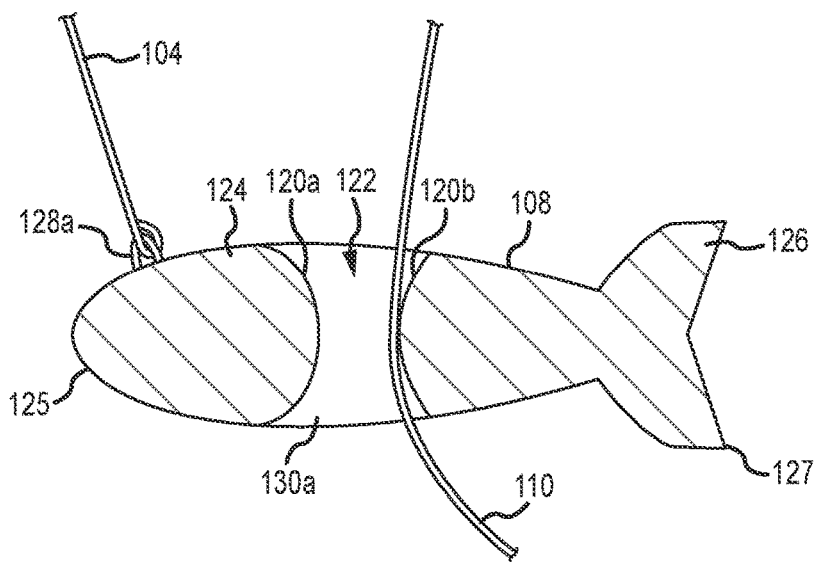
FIG. 2A is a side cross-sectional view of a deployment apparatus that can be incorporated in the sub-sea deployment system of FIG. 1.
Figure 2B:
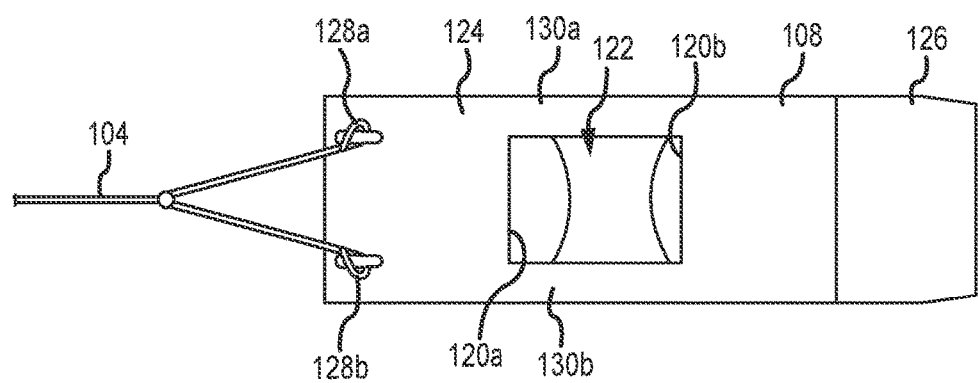
FIG. 2B is a top view of the deployment apparatus of FIG. 2A.
Figure 2C:
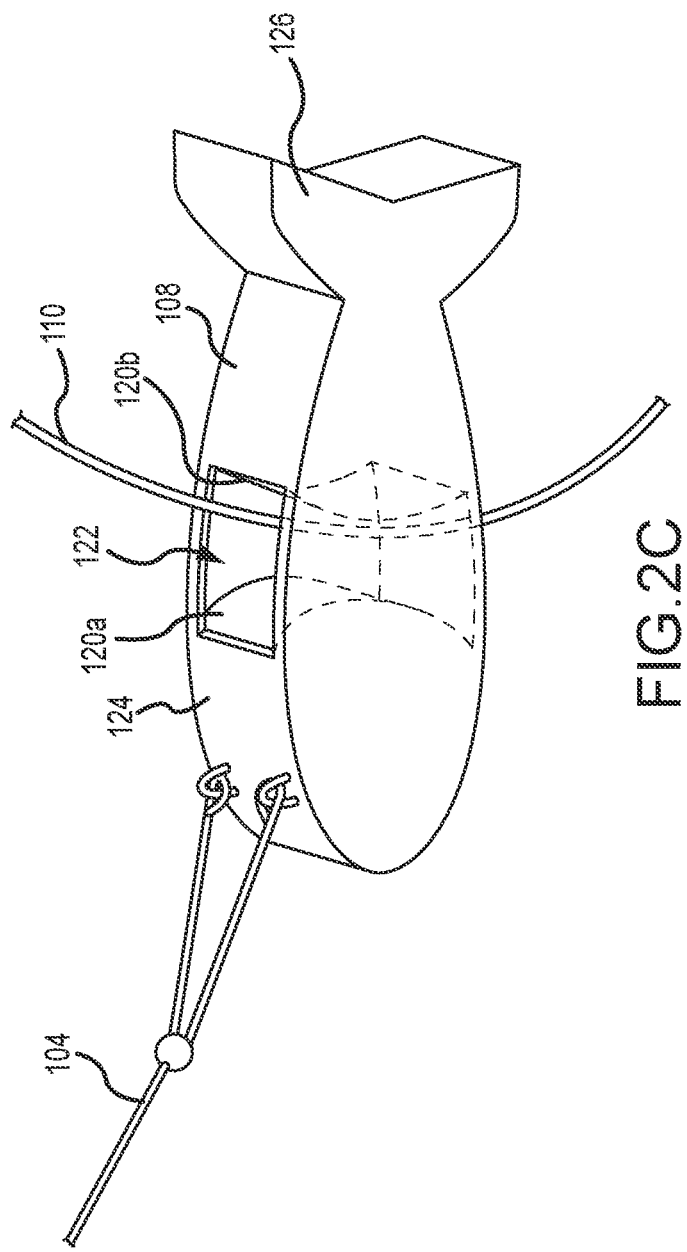
FIG. 2C is a perspective view of the deployment apparatus of FIG. 2A.

Referring to FIGS. 2A and 2B, the deployment apparatus 108 can be heavily weighted (e.g., by having a combination of ballast materials and ballast tanks), with a low hydrodynamic profile to minimize drag. In such embodiments, the deployment apparatus 108 can be provided with a body 124 having a rounded front end 125, and a rudder component or fin stabilizers 126 at the rear end 127. The deployment apparatus 108 may include one or more points 128a, 128b for fixed or articulated attachment of the tow line 104, or other attachments.

FIGS. 2A and 2B show an embodiment of a deployment apparatus 108 having surfaces 120a, 120b for contacting the carrier line 110 to stabilize the tow line 104 and facilitate in deployment and placement of the nodes 112. The body 124 of the deployment apparatus 108 defines an aperture or recess 122 that is adapted to receive the carrier line 110. In some embodiments, an aperture 122 extends through the deployment apparatus, and the carrier line 110 extends through the aperture 122. A front curved surface 120a and a rear curved surface 120b define the front and rear ends of the aperture 122, respectively. Thus, as the carrier line 110 moves through the water and contacts the curved surfaces 120a, 120b of the deployment apparatus 108, tension is applied to the carrier line 110 while minimizing the amount of stress exerted thereto. In some embodiments, the surfaces 120a, 120b are curved and are substantially free from sharp corners.

Additionally or alternatively, other surfaces of the deployment apparatus 108 may be curved. For example, the side walls 130a, 130b may be curved or otherwise hydrodynamically shaped. In some embodiments, the aperture 122 has a circular shape when viewed from the top of the deployment apparatus 108 (see FIG. 8B). In other embodiments, rather than the curved surfaces 120a, 120b defining an aperture 122, one or more curved surfaces may be located on an outer surface of the deployment apparatus 108 to define a recess or opening 122 in body 124.

The deployment apparatus 108 is configured to receive the node 112 and facilitate the node 112 as it travels through the recess or aperture 122. The deployment apparatus 108 is configured to minimize the forces experienced by the node 112 as it contacts the deployment apparatus 108 and travels through the recess or aperture 122.

FIG. 1 shows a hydrodynamic fairing 106 configured for one or more of reducing drag, lateral steering of tow line 104, e.g., in the form of a steerable foil device 506 as described herein. The fairing 106 may also incorporate a ballast weight system or positive buoyancy system, or both, as adapted to help control buoyancy as the deployment apparatus 108 is towed. In some embodiments, the system 100 includes more than one such fairing 106 positioned along the tow line 104, and in other embodiments the system 100 may not necessarily include any such fairings 106. In addition, the tow line or cable 104 and/or carrier line 110 can be made of steel wire or other material adapted to provide lower drag, or synthetic rope or other suitable materials.

In embodiments, the deployment apparatus 108 is towed behind vessel 102 by the tow line 104 to a desired position above the ocean bottom or floor 118. As will be described in further detail below, the setback position of the deployment apparatus 108 may be controlled by the speed of the vessel 102, drag properties of the deployment apparatus 108, and/or the tow line 104 payout.

Figure 3:
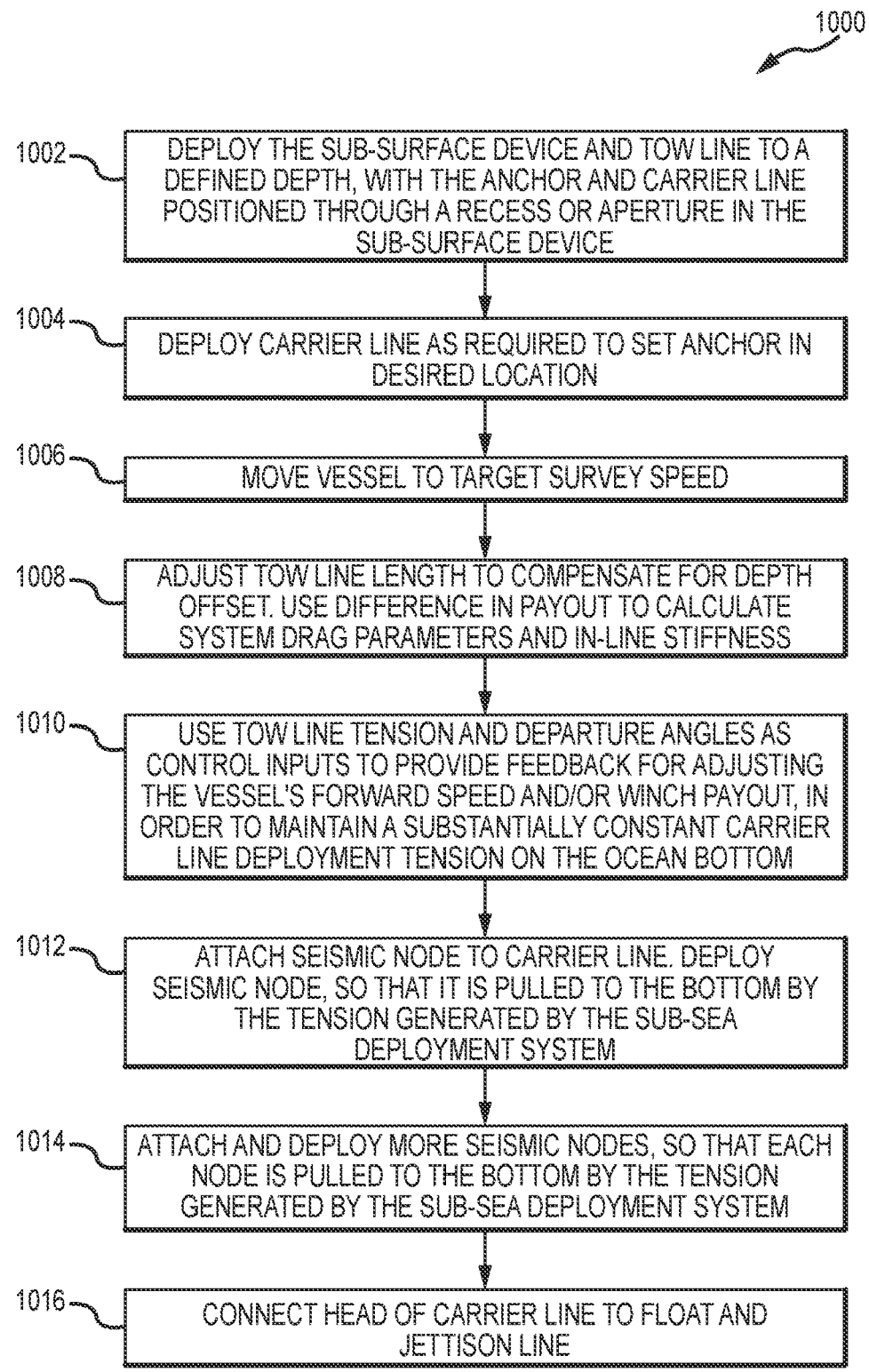
FIG. 3 is a flowchart of a method for deploying seismic nodes using a sub-sea deployment system, according to an embodiment.

FIG. 3 is a flowchart of a method 1000 for deploying seismic nodes using a sub-sea deployment system, according to an embodiment. In step 1002, the deployment apparatus 108 and tow line 104 are deployed to a defined depth, e.g., with the anchor and carrier line being positioned while the tow vessel is in motion.

The anchor 119 and carrier line 110 are positioned through the deployment apparatus 108. For example, in embodiments in which the deployment apparatus 108 has an aperture 122, the carrier line 110 extends through the aperture 122. Alternatively, aperture 122 is formed as a recess or opening adapted to accommodate the carrier line 110.

The carrier line 110 is in contact with the deployment apparatus 108 located behind the tow line 104. Tension on the tow line 104 acts to stabilize the deployment apparatus 108. In step 1004, the carrier line is deployed as required to set the anchor in a desired location. For example, in embodiments, the carrier line 110 is deployed so that the line 110 and the anchor 119 match the speed of the vessel 102; the anchor 119 is moved until it sets within the ocean bottom or floor 118. In step 1006, the vessel 102 is moved to a target survey speed (e.g., five knots or more).

In step 1008, the tow length of line 104 is adjusted to compensate for depth offset, in order to maintain the deployment apparatus 108 at a desired distance D1 above the ocean bottom or floor 118. The difference in payout of the tow line 104 is used to calculate system drag parameters and in-line stiffness.

In step 1010, the tow line 104 tension and departure angle θ are used as control inputs to provide feedback for adjusting the forward speed of vessel 102 and/or winch payout, in order to maintain a substantially constant carrier line 110 deployment tension on the ocean bottom. A control system and deployment apparatus 108 can modulate the lay tension as necessary. Further details are described below.

In step 1012, after a sufficient length of anchor line (percentage of survey depth) is deployed to the bottom, a seismic node 112 is attached to the carrier line 110 and deployed. The seismic node 112 is pulled to the bottom by the tension generated by the sub-sea deployment system (e.g., anchor 119 and deployment apparatus 108).

In step 1014, more seismic nodes 112 are attached to the carrier line 110 and deployed, each being pulled to the bottom by the tension generated by the sub-sea deployment system. In step 1016, the head of the carrier line is connected to the float and the line is jettisoned.

The tension generated by the above described sub-sea deployment system provides a significantly increased deployment speed. For example, without the interacting deployment apparatus 108, typical free fall node deployments are limited to approximately 1 m/s due to the low specific gravity of the system and high drag coefficients of the carrier line 110. Using the tow line 104 and deployment apparatus 108, the deployments speeds may be boosted, thus significantly improving operational efficiency.

In some embodiments, the deployment apparatus 108 is configured to provide substantially constant, non-zero tension between the anchor 119 and the vessel. For example, the anchor 119 acts to pull everything off of the vessel. In other embodiments, the deployment apparatus 108 is configured so that there is non-zero tension between the vessel and the deployment apparatus 108, and near zero or zero tension between behind the deployment apparatus 108 (e.g., between the deployment apparatus 108 and the anchor 119). For example, the curved surfaces 120a,120b can be shaped to cause this change in tension in the carrier line 110. In these embodiments in which the deployment apparatus 108 causes the change in tension, the nodes 112 travel faster throughout the water column and then slower behind the sub-surface sheave. This slowing down protects the nodes from damage and provides improved accuracy in placement. In additionally or alternative to the deployment apparatus 108 being configured to change the tension, the system may include subsea dimensioning devices, such as simplified cable engines, traction machines, cable squirters and/or a subsea capstan.

In some embodiments, the free end of the carrier line 110 is attached to a surface float that is released and returns to the surface for recovery. In some embodiments, the carrier line remains attached to the vessel 102.

Figure 4:
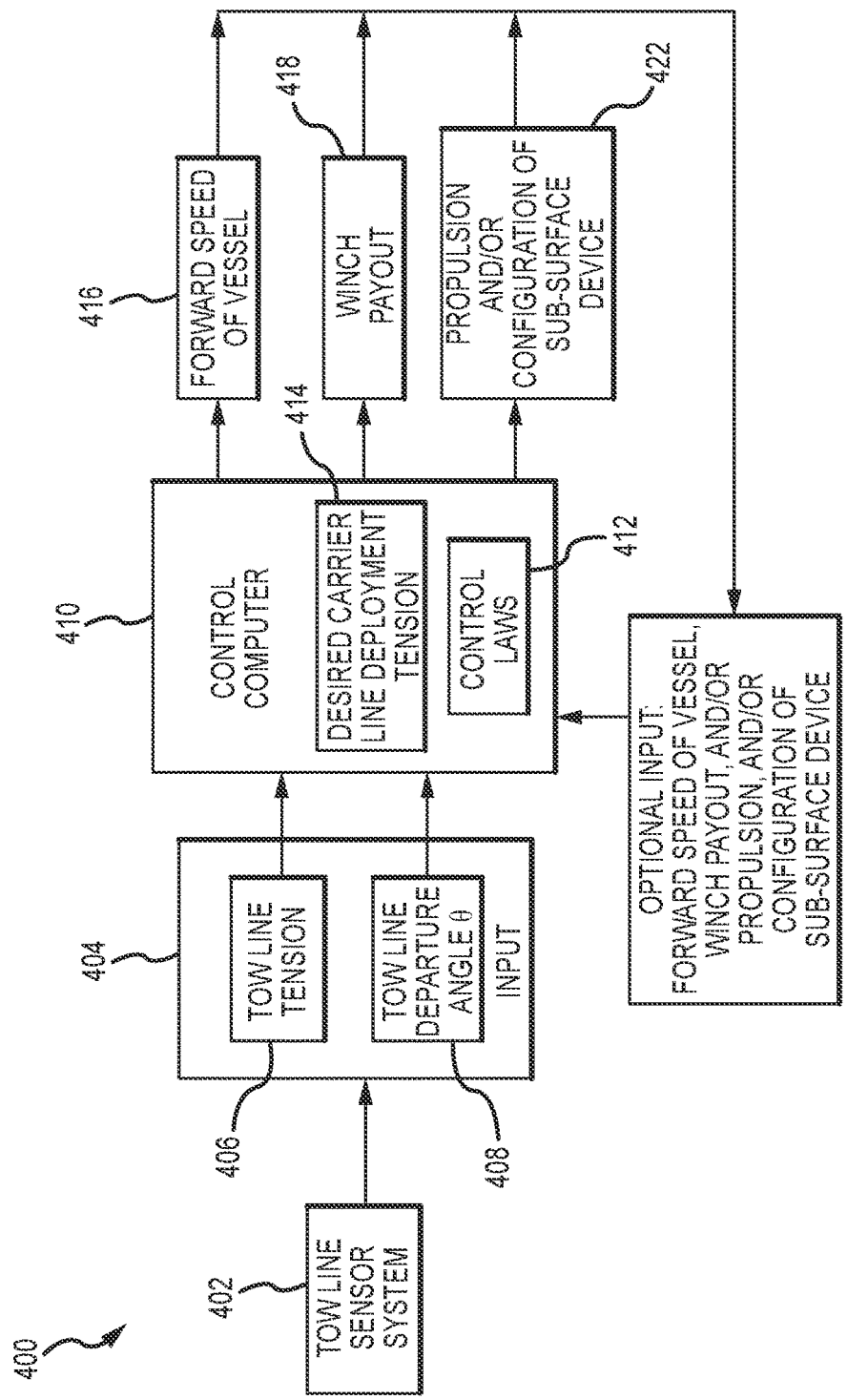
FIG. 4 is a block diagram of a control environment, according to an embodiment.

FIG. 4 is a block diagram of a control environment 400, according to an embodiment. The control environment 400 controls the setback position of the deployment apparatus 108 by determining a speed of the vessel 102, tow line 104 payout, and/or drag properties of the deployment apparatus 108.

Tow line sensor system 402 includes sensors for measuring various parameters of the tow line 104 that can be used for determining the tension and departure angle θ of the tow line 104. The tow line sensor system 402 is communicatively coupled to a control computer 410, which receives the input 404 comprising input indicative of the tow line tension 406 and input indicative of the tow line departure angle 408.

The control computer 410 includes a non-transitory computer readable medium containing computer readable instructions that are executable by the one or more processors. The instructions may include control laws 412 and information indicating a desired carrier line deployment tension 414. Upon receiving the input 404, computer 410 uses the input 404, control laws 412 and desired carrier line deployment tension 414 to determine at least one of a forward speed of the vessel 416, winch payout 418 for the tow line 104, or propulsion and/or configuration of the deployment apparatus 108 in order to control the setback position of the deployment apparatus 108.

In some embodiments, the computer 410 causes the determined forward speed of the vessel 416 to be communicated to an operator (e.g., via audio and/or visual display), and the operator controls the vessel 102 to move it to the determined speed. In some embodiments, the computer 410 automatically causes the vessel 102 to move to the determined forward speed of the vessel 416.

In additional embodiments, the tow line 104 is provided as a spool 114 on the vessel 102, and a winching system controls the length of tow line 104 that is paid out of the spool 114. For example, the winching system may include an actuator that can cause the spool 114 to roll forward to increase the amount of tow line 104 payout, and that can cause the spool 114 to roll backward to decrease the amount of tow line 104 payout.

In some embodiments, the winching system is controlled by an operator. In some embodiments, the computer 410 determines the winch payout 418 for the tow line 104, and dictates to the operator how much tow line 104 to add or remove from the payout (e.g., by displaying instructions to the operator); and the operator controls the actuator to roll the spool 114 forward or backward the appropriate amount. In some embodiments, the computer 410 limits the amount that the operator can roll the spool 114 forward and/or backward based on the determined payout 418. In some embodiments, the computer 410 automatically commands the actuator to roll the spool 114 forward or backward the appropriate amount, based on the determined winch payout 418.

In some embodiments, the computer 410 controls configuration of the deployment apparatus 108 to cause the deployment apparatus 108 to move relative to the vessel 102 and to thus control the position of the deployment apparatus 108. For example, in some embodiments, the computer 410 can control movement of the fin stabilizer 126, bow and stern planes and/or other control surfaces, such as the control surfaces described with reference to FIGS. 8 and 9.

In embodiments in which the deployment apparatus 108 includes a propulsion system (see FIGS. 8-10), the computer 410 can control the propulsion of the deployment apparatus 108 to control the position of the deployment apparatus 108. The computer 410 can communicate to the deployment apparatus control surfaces and/or propulsion system, for example, via tow line 104.

In some embodiments, the computer 410 includes a feedback system, and at least one of the current forward speed of the vessel 416, the winch payout 418, or the propulsion and/or configuration of the deployment apparatus 422 are used as input 424 to determine updated values for at least one of the current forward speed of the vessel 416, the winch payout 418, or the propulsion and/or configuration of the deployment apparatus 422.

Figure 5A:
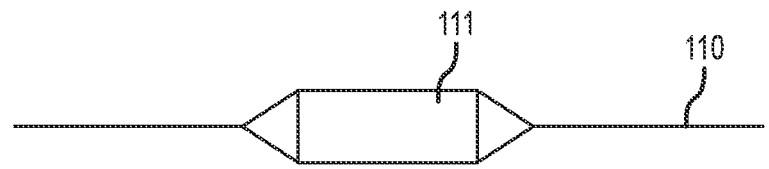
FIGS. 5A-5C show embodiments of seismic acquisition systems that can be deployed using the sub-sea deployment system of FIG. 1.
Figure 5B:
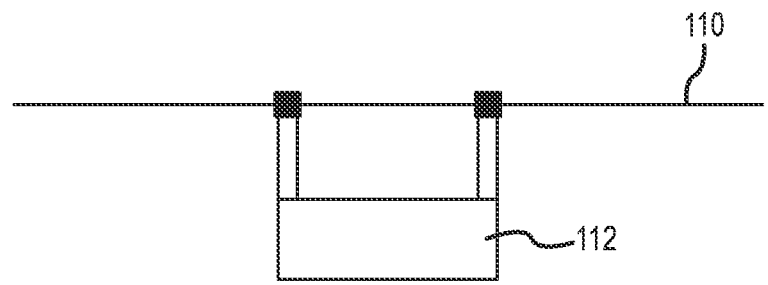
Figure 5C:
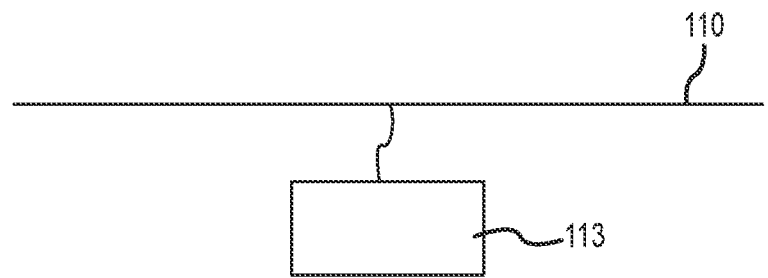

As shown in FIGS. 5A-5C, the sub-sea deployment system is configured to accommodate any suitable type of seismic acquisition systems. For example, FIG. 5A shows an in-line cable based node 111 in which the carrier line 110 extends longitudinally through the node 111. As shown, the node 111 may have tapered front and rear ends to reduce its hydrodynamic profile. In some embodiments, the node 111 is part of a VectorSeis® Ocean (VSO) system, provided by ION Geophysical Corporation of Houston Tex.

FIG. 5B shows an embodiment of a node 112 that is rigidly attached to the carrier line 110. FIG. 5C shows an embodiment of a node 113 that is tethered (flexibly attached) to the carrier line 110. While portions of this description refer to node 112, it should be well understood that the disclosed embodiments may be used to deploy nodes of various configurations, including, but not limited to, an in-line cable based node 111 and/or a tethered node 113.

Referring now to FIGS. 6A-6D, in some configurations, in order to further provide a higher tension in the carrier line between the vessel and the device 108 and a lower tension in the carrier line 110 behind the device 108, a deployment apparatus 208 may be reconfigurable between a pinching configuration (FIGS. 6A and 6B), in which it sufficiently pinches the carrier line 110 to increase its speed through the aperture 222, and a node receiving configuration (FIGS. 6C and 6D), in which it provides sufficient space to allow the nodes 112 to pass through the aperture 222. In some embodiments, the deployment apparatus 208 includes at least one component (e.g., wall 246) that is movable to alter the size of the aperture 222.

In the embodiment shown in FIGS. 6A-6D, the deployment apparatus 208 has many similar features as the deployment apparatus 108 described above with reference to FIGS. 2A and 2B. The deployment apparatus 208 has a body 124 with fin stabilizer 226 at its rear end one or more eyes 228a, 228b for attachment to the tow line 104. The body 224 of the deployment apparatus 208 defines an aperture 222 through which the carrier line 110 extends. The aperture 222 is defined by side walls 230a, 230b and curved surfaces 220a, 220b for contacting the carrier line 110.

Figure 6A:
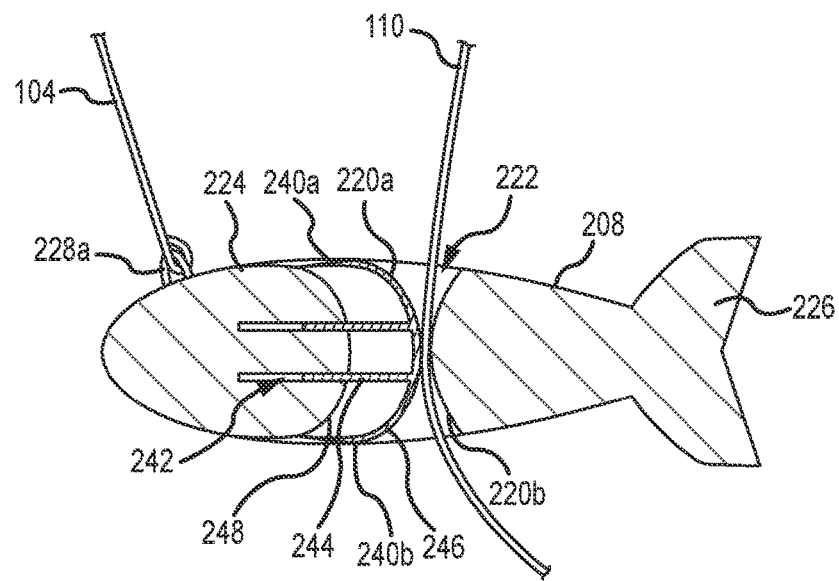
FIG. 6A is a side cross-sectional view of a deployment apparatus that can be incorporated in the sub-sea deployment system of FIG. 1, according to an embodiment, the deployment apparatus being in a pinching configuration.
Figure 6B:
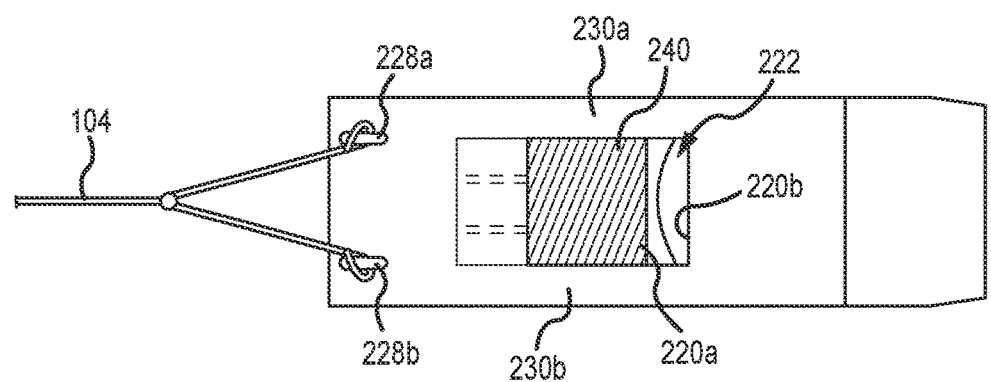
FIG. 6B is a top view of the deployment apparatus of FIG. 6A in the pinching configuration.
Figure 6C:
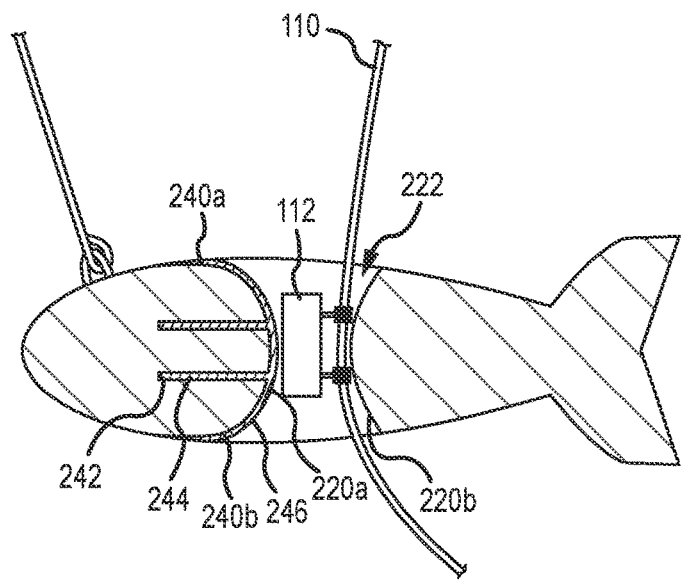
FIG. 6C is a side cross-sectional view of the deployment apparatus of FIG. 6A, the deployment apparatus being in a receiving configuration.
Figure 6D:
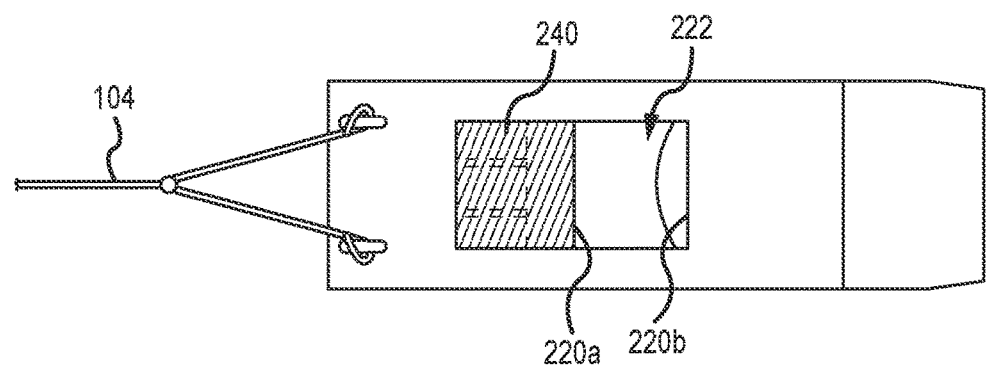
FIG. 6D is a top view of the deployment apparatus of FIG. 6A in the receiving configuration.
Figure 6E:
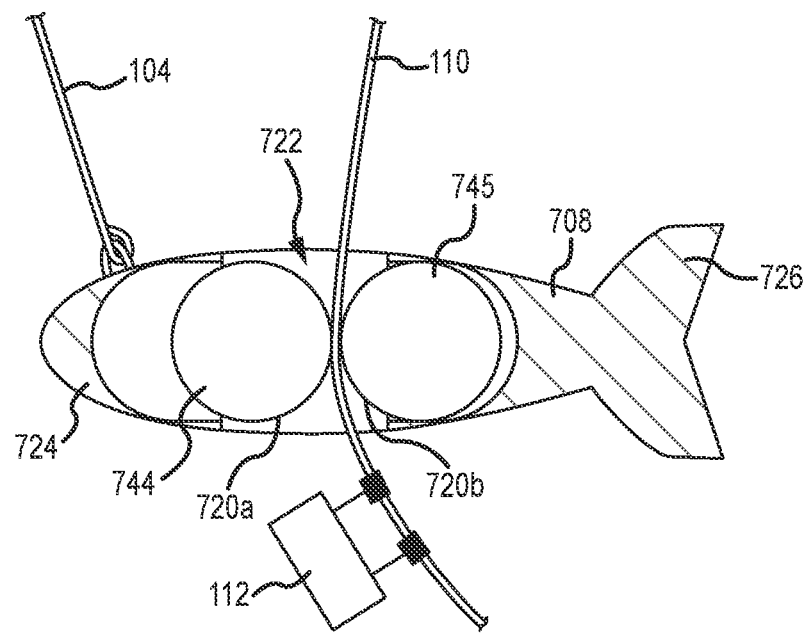
FIG. 6E is a side cross-sectional view of a deployment apparatus that can be incorporated in the sub-sea deployment system of FIG. 1, according to an embodiment, the deployment apparatus being in a pinching configuration.
Figure 6F:
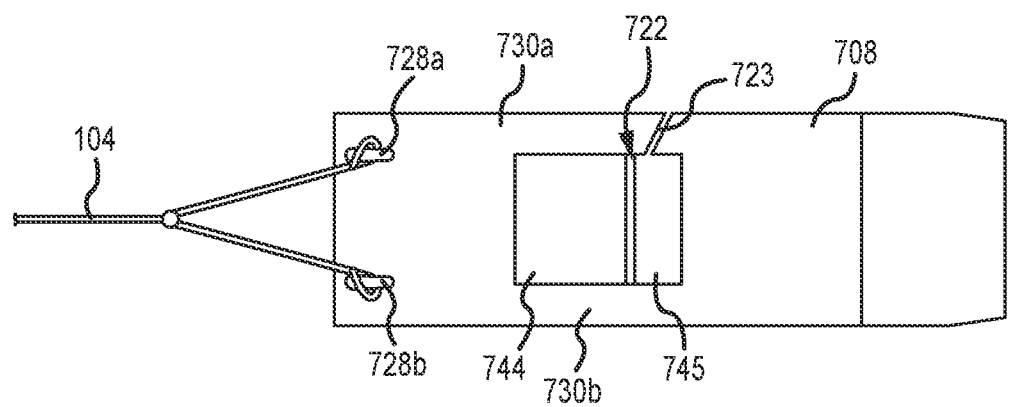
FIG. 6F is a top view of the deployment apparatus of FIG. 6E in the pinching configuration.

The wall 246 forms part of an extension 240 that is movable between a pinching configuration (e.g., extended position; FIGS. 6A and 6B) and a receiving configuration (retracted position; FIGS. 6C and 6D). The wall 246 includes the front surface 220a, which defines aperture 222. In the pinching configuration, the front curved surface 220a and rear curved surface 220b are sufficiently close to one another to pinch the carrier line 110, and thus increase the speed of the carrier line 110 traveling through the aperture 222. In the receiving configuration, the front curved surface 220a and rear curved surface 220b are sufficiently far away from one another to define an aperture 222 sized and configured to receive a node 112 traveling therethrough. The extension 240 may be movable through various suitable articulations.

In the embodiments shown in FIGS. 6A-6D, one or more rods 244 extend from the wall 246 and into respective cavities 242 within the body 224 of the deployment apparatus 208. As shown in FIG. 6C, in the retracted position, the rods 244 are disposed within the cavities 242, and the wall 246 is substantially flush with the adjacent surface 248 of the body 224. The extension 240 may include upper and lower walls 240a, 240b that interact with the body 224 to maintain the low hydrodynamic profile of the deployment apparatus 208.

As shown in FIG. 6D, in some embodiments, a slot or similar structure 223 may extend from aperture 220 through one or both of side walls 220a, 220b. Thus, an intermediate portion of the carrier line can be laterally positioned into aperture 220 between the side walls, without requiring access to a free end of the carrier line.

In such embodiments, a deployment apparatus control system can be provided to communicate with an actuator for controlling the movement of the surface 220a between extended and retracted positions. In some embodiments, the deployment apparatus control system is a system located on board the vessel and/or within the deployment apparatus 208. In some embodiments, the deployment apparatus control system is the computer 410 described above with reference to FIG. 4.

In the embodiments shown in FIGS. 6E-6H, the deployment apparatus 708 has many similar features as the deployment apparatus 108 and apparatus 208 described above with reference to FIGS. 2A and 2B and FIGS. 6A-6D. The deployment apparatus 708 has a body 724 with fin stabilizer 726 at its rear end one or more eyes 728a, 728b for attachment to the tow line 104. The body 724 of the deployment apparatus 708 defines an aperture 722 through which the carrier line 110 extends. The aperture 722 is defined by side walls 730a, 730b and curved surfaces 720a, 720b for contacting the carrier line 110.

Figure 6G:
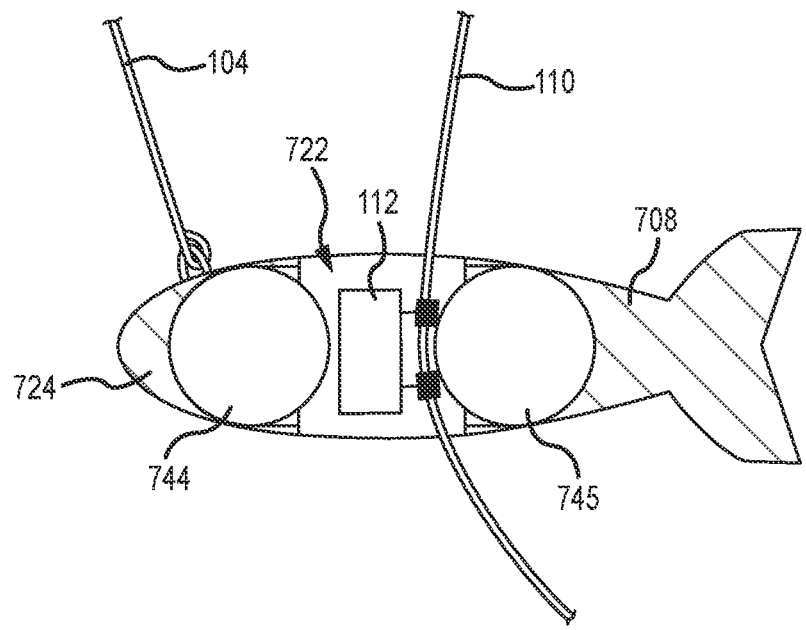
FIG. 6G is a side cross-sectional view of the deployment apparatus of FIG. 6E, the deployment apparatus being in a receiving configuration.
Figure 6H:
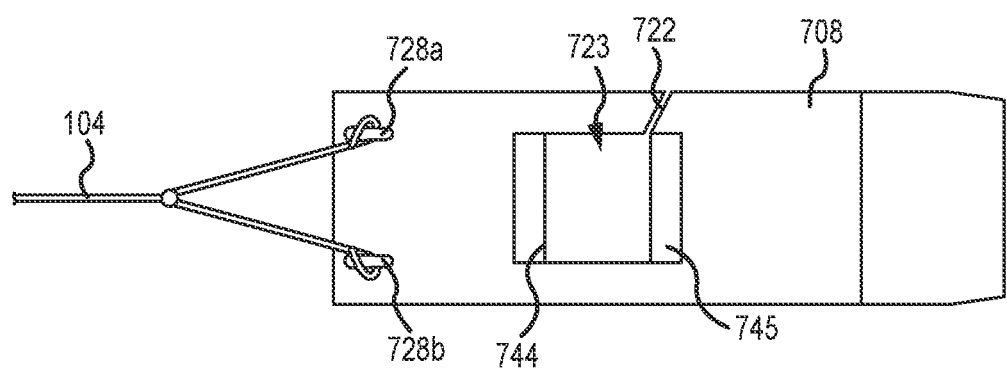
FIG. 6H is a top view of the deployment apparatus of FIG. 6E, the deployment apparatus being in the retracted configuration as shown in FIG. 6G.

Two wheels, drums or cylinders 744, 745 are movable between a pinching configuration (e.g., FIGS. 6E and 6F) and a receiving configuration (FIGS. 6G and 6H). The wheels 744, 745 each include a respective front surface 720a, 720b which defines aperture 722. In the pinching configuration, the front curved surface 720a and rear curved surface 720b are sufficiently close to one another to pinch the carrier line 110, and thus control the tension and/or relative speed of the carrier line 110 engaged with or passing through the aperture 722. In the receiving configuration, the front curved surface 720a and rear curved surface 720b are sufficiently far away from one another to define an aperture 722 sized and configured to receive a node 112 traveling along the carrier line through the aperture, from one side of the deployment apparatus to the other.

In the embodiments shown in FIGS. 6E-6H, the opposing and retractable wheels 744, 745 are powered such that, in the pinching configuration, they pinch on and pull on the rope to increase the tension of the carrier line 110, and retract to the receiving configuration to allow the carrier line 110 and node 112 to travel across or through the apparatus. Thus, the two opposing (and retractable) wheels 744, 745 form the opening or aperture 722 in the deployment device. In one such embodiment, the two wheels 744, 745 are powered such that they pinch on and pull on the rope or carrier line 110, with the ability to retract and form an opening 722 to let a node 112 pass through from one side of the deployment apparatus to the other, when it arrives along carrier line 110.

In such embodiments, a deployment apparatus control system can be provided to communicate with an actuator for controlling the movement of the wheels 744, 745 between pinching and receiving configurations. In some embodiments, the deployment apparatus control system is a system located on board the vessel and/or within the deployment apparatus 708. In some embodiments, the deployment apparatus control system is the computer 410 described above with reference to FIG. 4.

Figure 7:
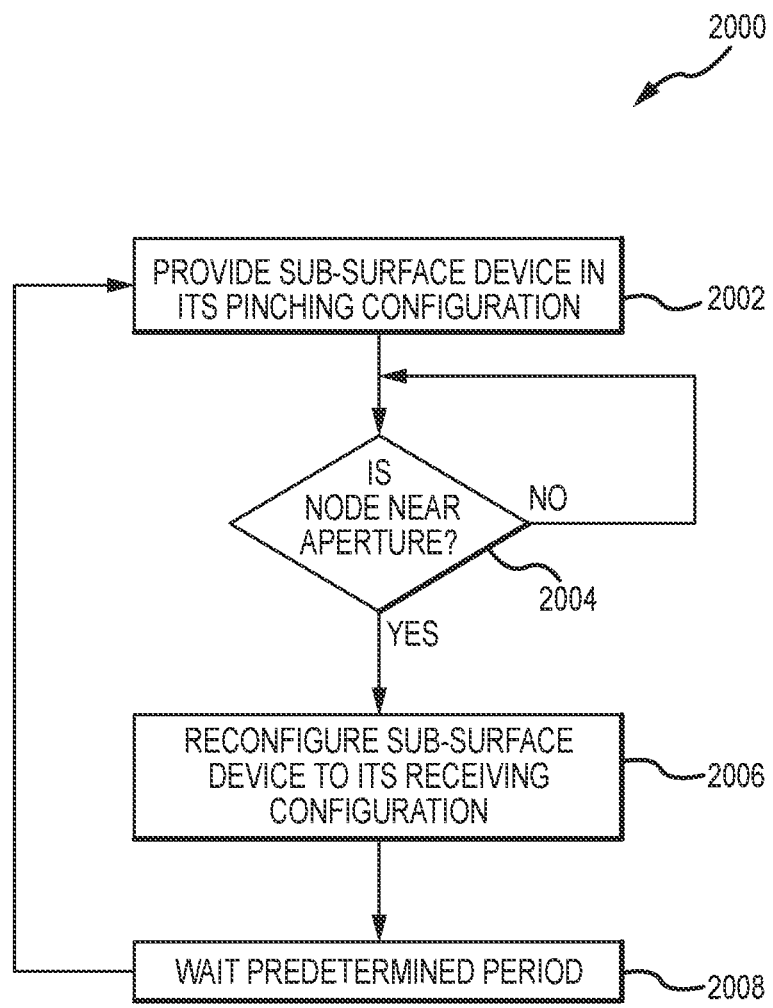
FIG. 7 is a flowchart of a method for reconfiguring a deployment apparatus between a pinching configuration and a receiving configuration, according to an embodiment.

FIG. 7 is a flowchart showing a method 2000 for reconfiguring a deployment apparatus (e.g., 208 or 708), according to an embodiment. In step 2002, the deployment apparatus 208, 708 is provided in its pinching configuration. For example, for the embodiment shown in FIGS. 6A-6D, the wall 246 having the curved surface 220a is positioned in its extended position, as shown in FIGS. 6A and 6B. For the embodiment shown in FIGS. 6E-6H, the wheels 744, 745 are positioned in their pinching configuration.

In step 2004, the deployment apparatus control system determines whether a node 112 is located near the aperture 222, 722. In some embodiments, the deployment apparatus control system determines whether a node 112 is located near the aperture 222, 722 based on sensing whether a node 112 is proximate the aperture. For example, sensors may detect force exerted by a node 112 on the body 224, 724 of the deployment apparatus 208, 708. As another example, sensors may be optical sensors that can detect the presence of a node 112.

In some embodiments, the deployment apparatus control system determines whether a node 112 is located near the aperture 222, 722 based on determining whether a predetermined amount of time has lapsed since the previous node 112 passed through the aperture 222, 722. In some embodiments, the deployment apparatus control system determines whether a node 112 is located near the aperture 222, 722 based on determining whether a predetermined amount of carrier line 110 has passed through the aperture since the previous node 112 passed through the aperture 222.

In step 2006, upon determining that a node 112 is near the aperture 222, 722, the deployment apparatus control system reconfigures the deployment apparatus 208, 708 to its receiving configuration. For example, for the embodiment shown in FIGS. 6A-6D, and actuator moves the surface 220a to its retracted position. For the embodiment shown in FIGS. 6E-6H, the wheels 744, 745 move to their retracted position.

In step 2008, upon waiting a predetermined period, the deployment apparatus control system causes the actuator to move the surface 220a back to its extended position. The predetermined period may be a predetermined period of time or payout of the carrier line 110. In some embodiments, the deployment apparatus control system causes the actuator to move the surface 220a to its retracted position, based on determining that a node 112 is not detected near the aperture 222.

While FIGS. 6A-6D and 7 describe embodiments in which the front surface 220a is movable, additionally or alternatively, another surface may be movable in order to alter the size and/or configuration of the aperture 222. For example, in some embodiments, the rear surface 220b is movable instead of or in addition to the front surface 220a.

Figure 8A:
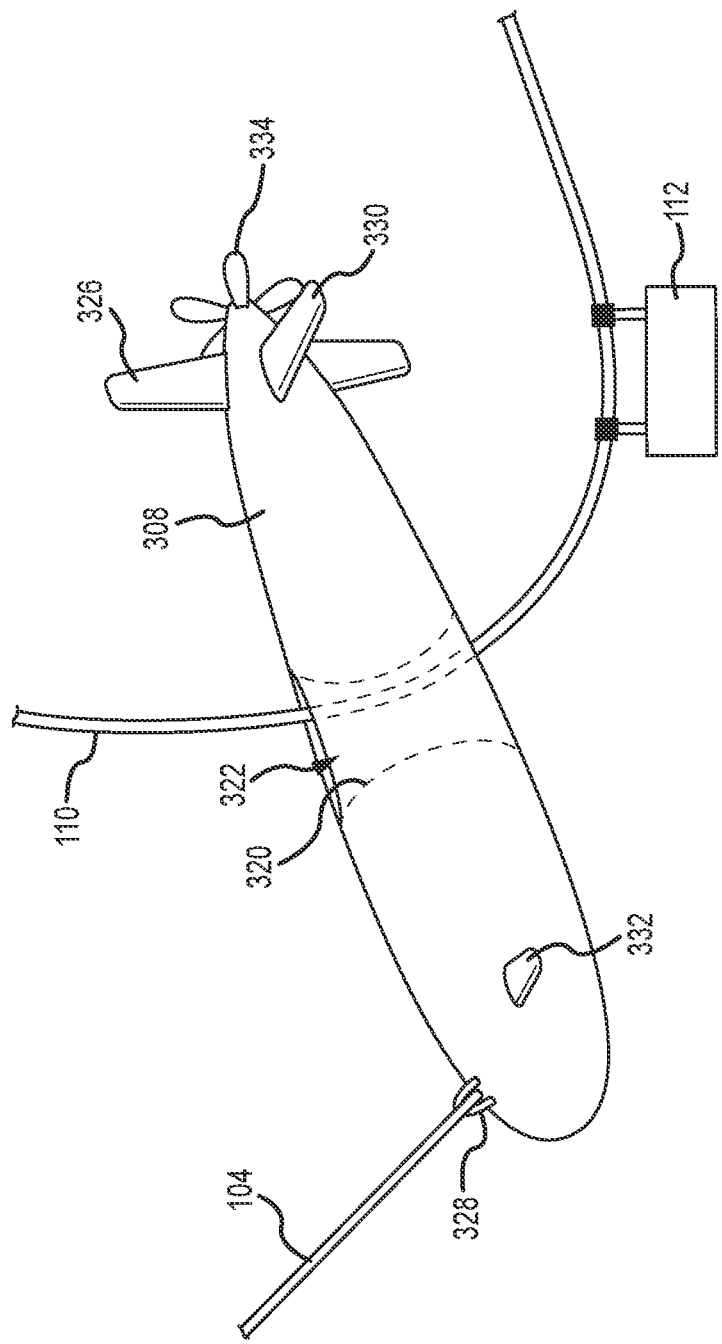
FIG. 8A is a perspective view of a deployment apparatus that can be incorporated in the sub-sea deployment system of FIG. 1, according to an embodiment.
Figure 8B:
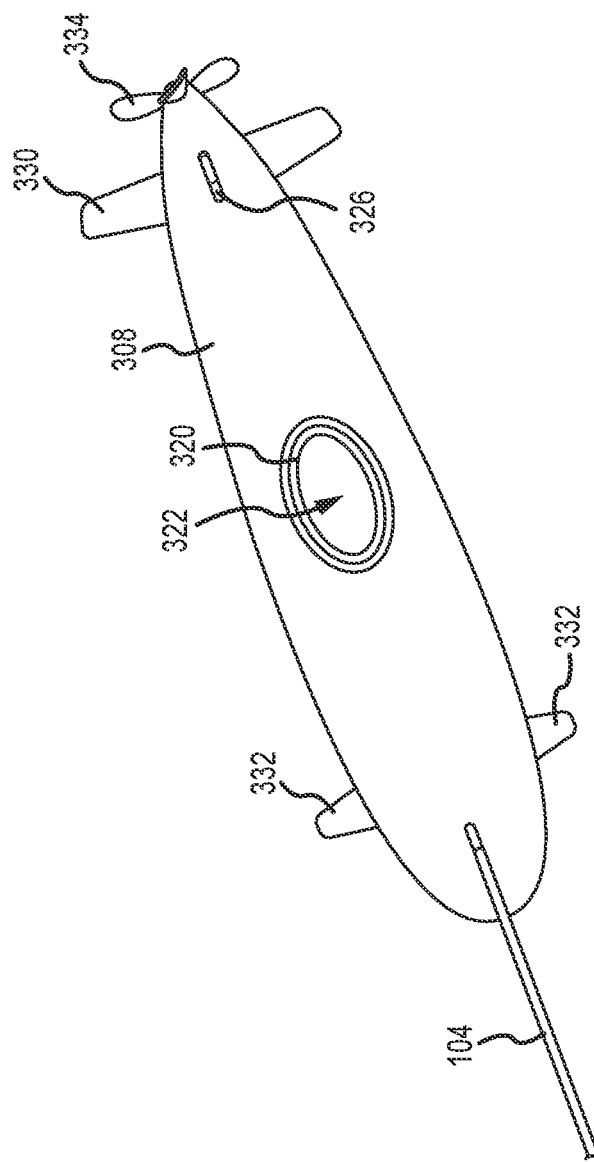
FIG. 8B is a top view of the deployment apparatus of FIG. 8A.

Turning now to FIGS. 8A and 8B, in some embodiments, the deployment apparatus 308 can include one or more control surfaces to adjust and control the movement of the deployment apparatus 308 through the water. FIG. 8 shows an embodiment of a deployment apparatus 308 having a rudder 326 for steering the deployment apparatus 308.

For controlling the depth of the deployment apparatus 308, stern planes 330 are located at the rear and bow planes 332 are located at the front of the deployment apparatus 308. In some embodiments the bow planes 332 are movable between a retracted position and an extended position. The bow planes 332 may be foldable upon the sides of the deployment apparatus 108, or may retract within a cavity of the deployment apparatus 308 (e.g., may be telescopically retractable).

It should be well understood that the deployment apparatus 308 may exclude any number of these control surfaces while remaining within the scope of this disclosure. It should also be well understood that deployment apparatus 308 may have any number of other control surfaces while remaining within the scope of this disclosure.

In some embodiments, the rudder 326, stern planes 334, and/or bow planes 332 are reconfigurable to utilize fluid dynamics control techniques to modify the position of the deployment apparatus 308. A control system can communicate to the deployment apparatus 308 (e.g., via tow line 104) to alter any one or more of the control surfaces 326, 334, 332 to control movement of the deployment apparatus 308. For example, control system can alter the position of one or more of the control surfaces 326, 334, 332 in order to reposition the deployment apparatus 308 with improved accuracy.

As shown in FIG. 8, in embodiments, the deployment apparatus 308 has a propulsion system including a propeller 334 for propelling the deployment apparatus 308. A control system can operate a motor to alter the speed of the propeller and thus control the propulsion of the deployment apparatus 308 through the water. A control system may control one or more control surfaces 326, 334, 332 as well as the propeller 334, in order to maneuver the deployment apparatus 308 to defined positions along the ocean floor 118. Thus, the nodes 112 may be deployed at predefined locations on the ocean floor 118 with improved accuracy in three dimensions. The control system may be a part of and/or communicate with the computer environment 400 described above with reference to FIG. 4.

Especially in embodiments providing improved maneuverability of the deployment apparatus 308, it is advantageous to reduce or prevent the carrier line 110 contact with corners. Thus, as shown in FIG. 8B, in embodiments, the aperture 222 may have a circular cross-section when viewed from the top of the deployment apparatus 308.

Figure 9:
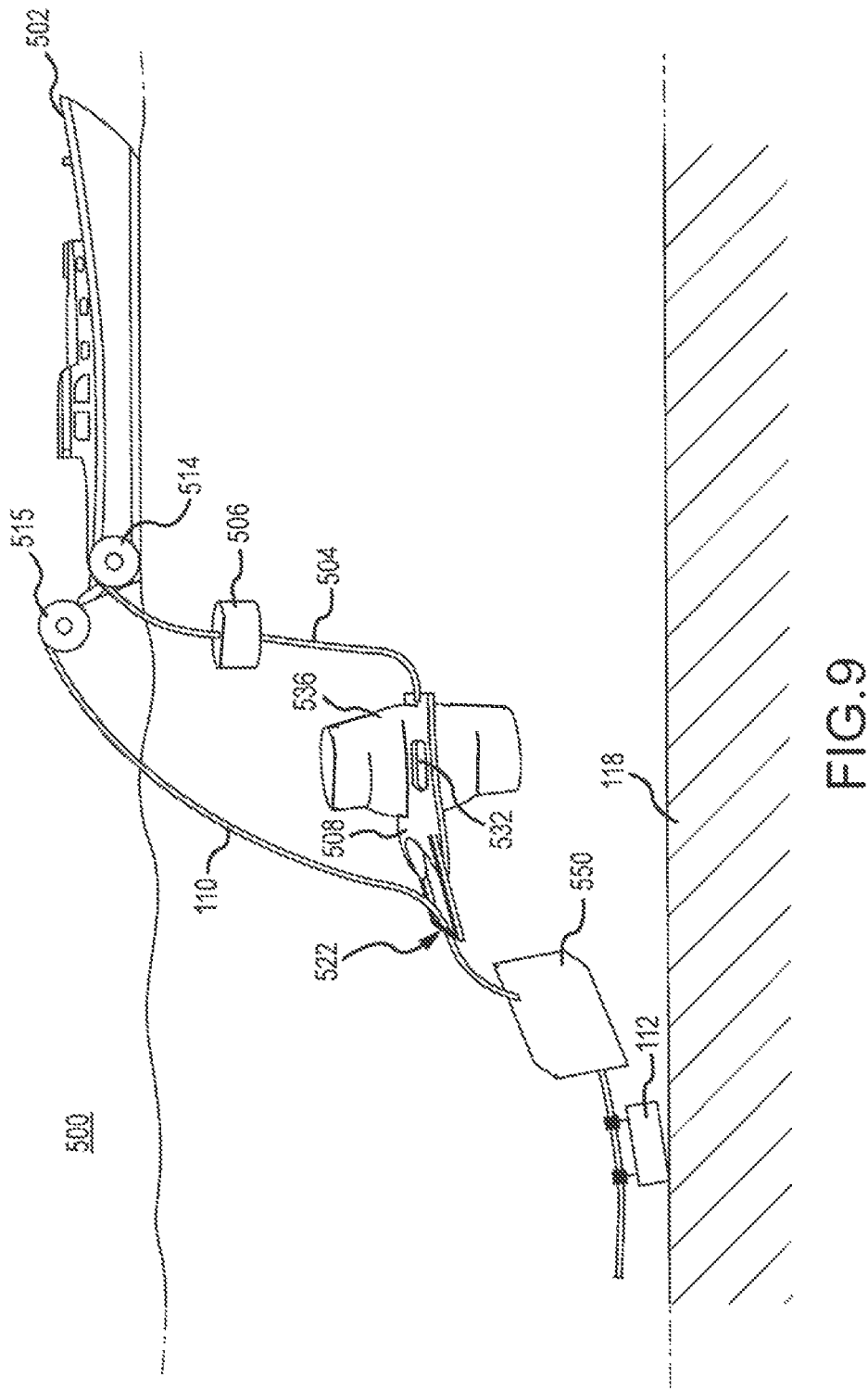
FIG. 9 is a schematic representation of a seismic vessel employing a sub-sea deployment system, according to an embodiment.

FIG. 9 shows another embodiment of a sub-sea deployment system 500. In this embodiment, a sub-surface deployment apparatus 508 is towed behind seismic vessel 502 via tow line 504. A node release mechanism or similar component 550 is installed between the deployment apparatus deployment 508 and the ocean floor 118, or at any other suitable location along the carrier line 110. The release component 550 contains or engages with at least one seismic node 112. The release component 550 may release the node 112 at a location on or near the ocean floor with improved accuracy.

For example, the release component 550 may be activated by a timer, or by acoustics remotely de-tensioning the line. In another embodiment, an over tension of the carrier line 110 may initiate a release of a node 112. In some embodiments, a control system communicates with the release component 550 to cause release of a node 112 at a dictated location.

As shown, the deployment apparatus 508 may include bow planes 532 for controlling the depth. A hydrolytically configured, ballasted, vertically oriented foil structure 536 provides improved flow, buoyancy control and dynamic positioning. The deployment apparatus 508 defines an aperture 522 through which the carrier line 110 extends.

In some embodiments, a fairing or foil apparatus 506 may be provided on tow line 504, or elsewhere as disclosed. For example, the apparatus 506 can be configured as a steerable fairing string, "sailwing" or segmented foil device having a suitable control surface, e.g., as disclosed in copending U.S. patent application Ser. No. 14/353,075, STEERABLE FAIRING STRING, PCT/CA2012/000996 filed Oct. 26, 2012 (U.S. Publication No. 2014/0247691 A1); U.S. patent application Ser. No. 14/959,009, SEGMENTED-FOIL DIVERTER, filed Dec. 4, 2015 (U.S. Publication No. 2016/0161622 A1), U.S. patent application Ser. No. 15/295,481, DYNAMICALLY CONTROLLED FOIL SYSTEMS AND METHODS, filed October 2016 (U.S. Publication No. 2017/0106946 A1), and U.S. patent application Ser. No. 15/435,057, RIBBON FOIL DEPRESSOR, filed Feb. 16, 2017, each of which is incorporated by reference herein, in the entirety and for all purposes. In some of these embodiments, the lateral position of the deployment apparatus 508 can be controlled by steering tow line 104 via one or more fairing systems 506, navigating the deployment apparatus 508 through the water column and positioning the hydrodynamic body or foil structure 536 of the deployment apparatus with respect to the centerline of the tow vessel 502 (e.g., directly behind and below the vessel centerline, laterally to either side or the centerline, or to adjust the depth of deployment apparatus 508 in the water column).

Figure 10:
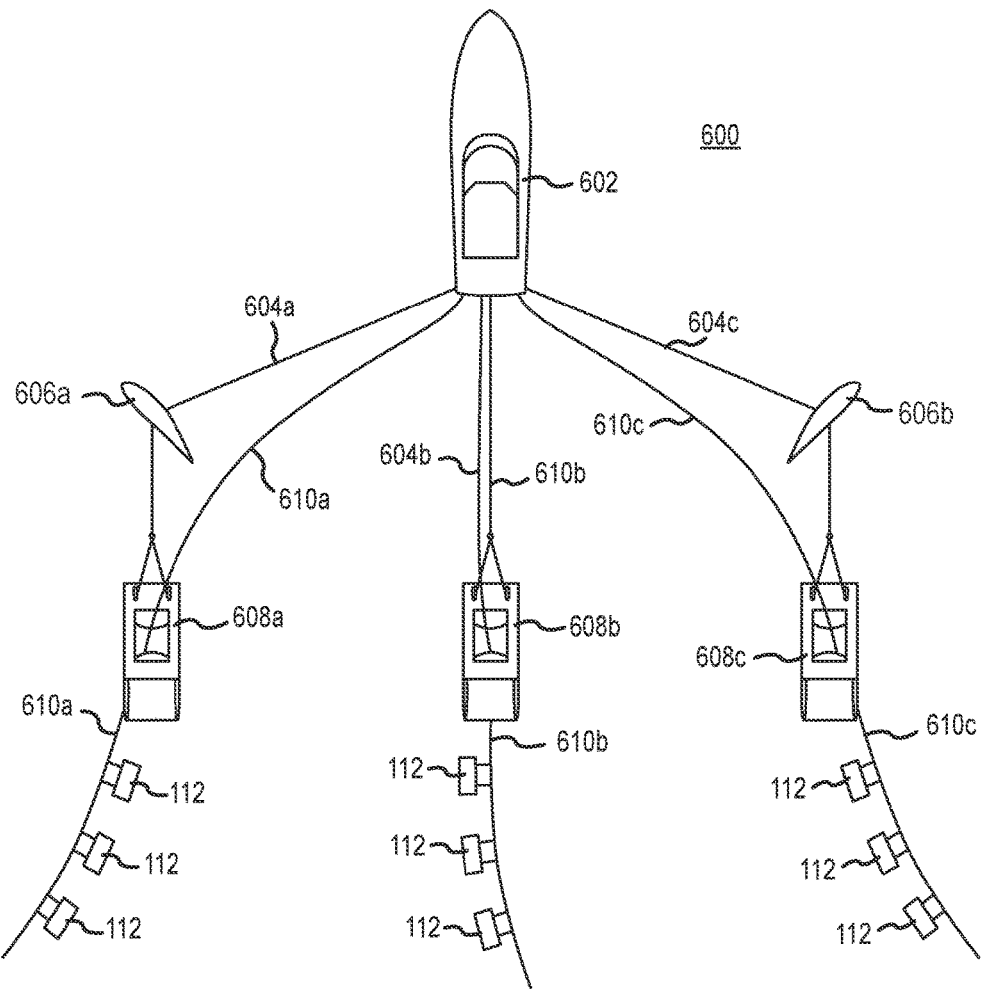
FIG. 10 is a top view of a schematic representation of a seismic vessel employing a sub-sea deployment system, according to an embodiment.

FIG. 10 shows an embodiment of a sub-sea deployment system 600 comprising a plurality of deployment apparatuses 608a-608c towed behind seismic vessel 602, to facilitate in the deployment of seismic nodes 112 via a plurality of carrier lines 610a-610c. While FIG. 10 shows three deployment apparatuses 608a-608c and three carrier lines 610a-610c, the number is exemplary, and any suitable number of one, two or more deployment apparatuses 608a-608c and carrier lines 610a-610c is encompassed.

In the embodiment of FIG. 10, one deployment apparatus 608b is towed substantially directly behind the seismic vessel 602, while other deployment apparatuses 608a, 608c are deployed positioned laterally to the vessel centerline. For example, subsurface deflectors 606a, 606b may be disposed on tow lines 604a, 604 to provide lateral forces to position the deployment apparatuses 608a, 608c via the tow lines 604a, 604c.

In some embodiments, paravanes or steerable foil devices 606a, 606c can be used to provide lateral forces to position the tow lines 604a-604c and deployment apparatuses 608a-608c laterally. Such paravanes or foil devices may or may not have adjustable control surfaces. In some embodiments, a steerable foil configured with an underwater sheave can be employed to provide the lateral forces to position the tow lines 604a-604c and deploy nodes 112 with deployment apparatuses 608a-608c positioned laterally in a desired location with respect to the centerline of tow vessel 602. Suitable steerable foil embodiments of devices 606a, 606c are described in copending U.S. patent application Ser. No. 14/353,075, filed October 26; U.S. patent application Ser. No. 14/959,009, filed Dec. 4, 2015, U.S. patent application Ser. No. 15/295,481, filed October 2016, and U.S. patent application Ser. No. 15/435,057, filed Feb. 16, 2017, each of which is incorporated by reference above.

Figure 11:
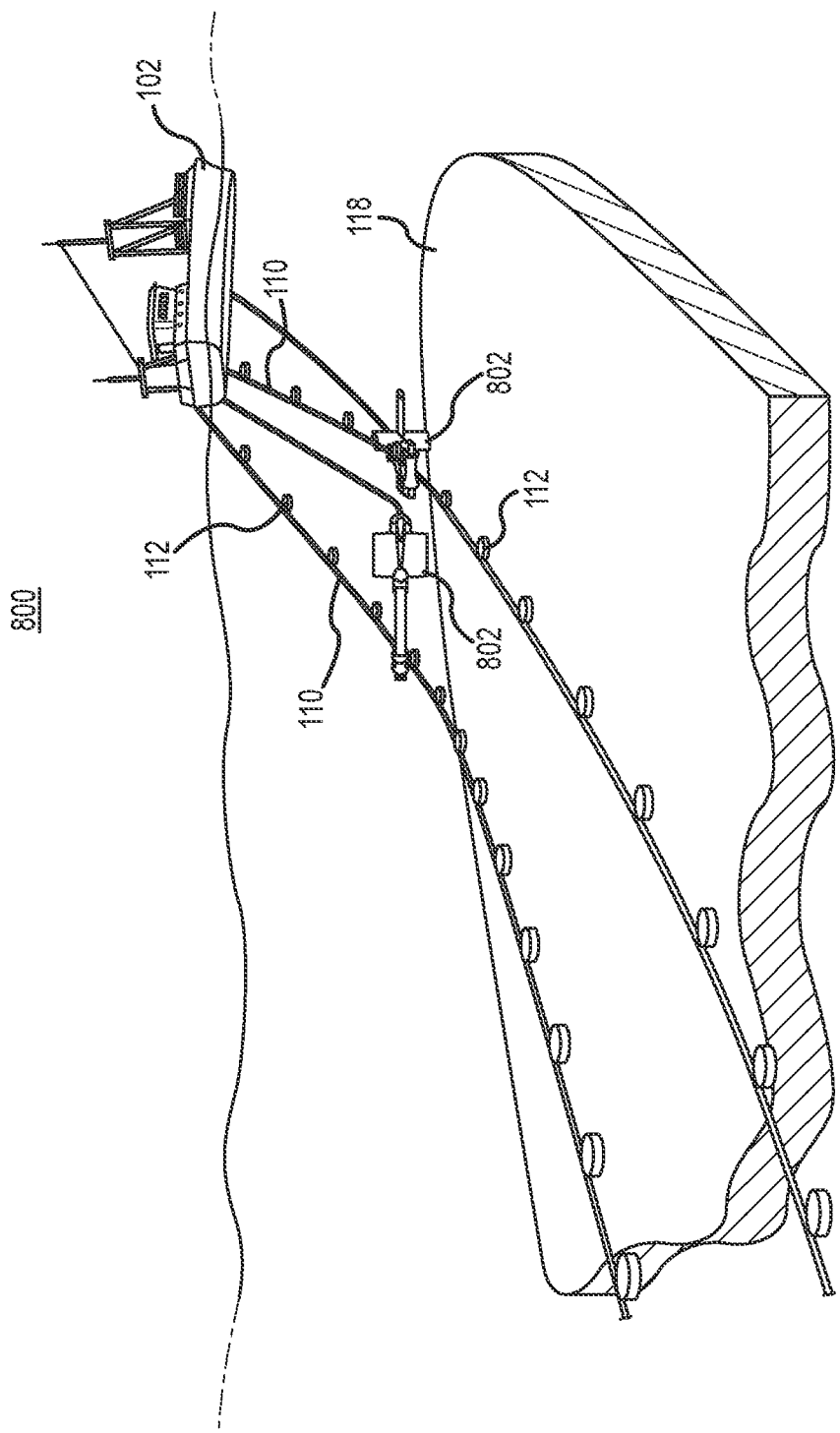
FIG. 11 is a schematic representation of a seismic vessel employing a sub-sea deployment system, according to an embodiment.

FIG. 11 is a schematic representation of a seismic vessel 102 employing a sub-sea deployment system 800, according to an embodiment. Seismic receivers or nodes 112 are deployed from the seismic vessel 102 by way of a carrier line 110. In order to improve deployment rate and positioning accuracy, the sub-sea deployment system 800 includes at least one deployment apparatus 802 that is towed behind the vessel 102 by a tow line 104.

Figure 12A:
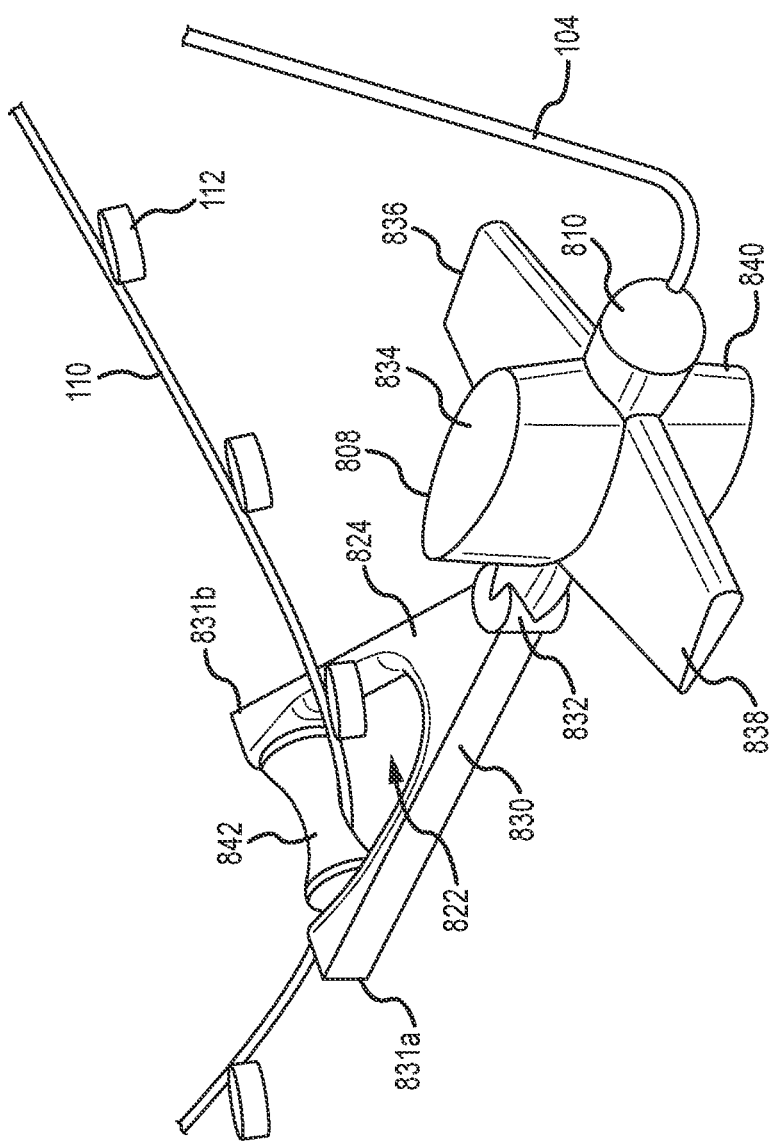
FIG. 12A is a perspective view of a deployment apparatus that can be incorporated in the sub-sea deployment system of FIG. 11.

FIGS. 12A and 12B show an embodiment of a deployment apparatus 808 having a wheel, drum or cylinder 842 configured for contacting and engaging the carrier line 110 to stabilize the carrier line 110 with respect to the tow line 104 and to facilitate in deployment and placement of the nodes 112. The body of the deployment apparatus 808 includes a forward hydrodynamic portion 810 and an aft deployment portion 824 that defines an aperture or recess 822 adapted to receive and engage the carrier line 110.

The wheel or drum 842 defines the aft portion of aperture 822, between sides or extensions 831a, 831b of tail portion 830. Thus, as the carrier line 110 moves through the water and engages the curved surface of wheel or drum 842 on deployment apparatus 808, a controlled tension can be applied to the carrier line 110, while minimizing the amount of undesirable stress exerted on carrier line 110.

In these particular embodiments, the tail portion 830 includes two extensions 831a, 831b, e.g., with a central rod or axle extending therebetween to allow the wheel or drum 842 to spin or rotate forward and backward. In some applications, the wheel or drum 842 is powered to rotate about the rod or axle. The wheel or drum 842 can also include spokes and/or teeth or other features configured to engage or trap the node 112 and apply a pulling or tension force on the node 112 and the carrier line 110.

In some embodiments, the deployment apparatus 808 includes a front portion 810 having one or more control surfaces. In the particular embodiment shown, for example, the front portion 810 includes two vertical wings or planes 834, 840 and two horizontal wings or planes 836, 838. The wings or planes 834, 836, 838, 840 may have a static configuration, or be powered and/or dynamically adjustable to allow controlled navigation of apparatus 808 to a desired depth and location.

In additional embodiments, the tail portion 830 can also articulate relative to the front portion 810. For example, the tail portion 830 can be configured to pivot about a pivot point 832, so as to further fine-tune the node positioning during deployment.

In the above description, reference is made to embodiments of the invention. It should be understood, however, that the invention is not limited to specific described embodiments. Rather, any suitable combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Likewise, reference to "the invention" shall not be construed as a generalization of any inventive subject matter disclosed herein and shall not be considered to be an element or limitation of the appended claims except where explicitly recited in the claims.

While the invention is thus described with respect to exemplary embodiments, it is understood that changes can be made and equivalents may be substituted to adapt the disclosure to different materials and situations, while remaining within the spirit and scope of the invention. The invention is thus not limited to the particular examples that are described, but encompasses all the embodiments that fall within the scope of the appended examples and claims.

EXAMPLES

A system comprising: a means or apparatus to position an ocean bottom acquisition system or telecommunication system on the ocean floor using a sub-surface sheave while under tow.

The system of any of the above examples, wherein the system comprises: a means or apparatus to position a sub-surface sheave in three dimensions relative to the surface tow vessel preferably close to the ocean bottom.

The system of any of the above examples, wherein a means or apparatus to control the touch down position of the ocean bottom acquisition system using the tension, tow line length and departure angle, or acoustic system(s).

The system of any of the above examples, such a system comprising: a means or apparatus redirecting an ocean bottom data acquisition system substantially vertically through the water column to substantially horizontally along the ocean bottom while under tow.

The system of any of the above examples, wherein the carrier line and node pass thru an aperture in/on the sub-surface sheave.

A system comprising: a means or apparatus deploying an ocean bottom acquisition system at deployment rates significantly faster than free fall velocities in water.

The system of any of the above examples, such a system comprising: a means or apparatus transferring a carrier line with seismic recorders thru the sub-surface sheave; a means or apparatus to control the specific gravity of the sheave; a means or apparatus to change depth of the sub-surface sheave; and a means or apparatus to control the lateral position of the carrier line.

A means or apparatus of any of the above examples, such a system comprising: a means to monitor carrier line deployment tension; a means to control carrier line deployment tension from the sheave; a means to control carrier line deployment tension from the release module.

A means or apparatus of any of the above examples, such a system comprising: a means or apparatus to control carrier line deployment tension from the release module; or a means or apparatus to control carrier line deployment tension anywhere along the deployed carrier line.

A means or apparatus of any of the above examples, such a system comprising: a means or apparatus to introduce tension signals onto the carrier line for the purpose to communicate with the seismic recorders, for example use of tension pulses to activate recorders or clocks; a means or apparatus to communicate inductively with the node as it passes thru the sheave; and a means or apparatus to control the carrier line tension during and after the initial touch down.

A system of any of the above examples, wherein the lateral and or vertical positions are controlled by stationary or moveable control surfaces integrated into the sub surface sheave.

A seismic deployment system, comprising: a deployment apparatus having a hydrodynamic body; a tow line configured for towing the hydrodynamic body through a water column; and a carrier line engaged with the deployment apparatus, the carrier line having a plurality of seismic sensors coupled therealong; wherein the deployment apparatus is configured to control tension in the carrier line for deployment of the seismic sensors while the hydrodynamic body is towed through the water column by the tow line.

Any such seismic deployment system, wherein the carrier line is coupled to the deployment apparatus by passage through an aperture provided between side walls of the hydrodynamic body. Such a system, further comprising a slot extending from the aperture through one of the side walls, the slot configured for positioning the carrier line into the aperture.

Any such system, wherein the deployment mechanism comprises a positioning member configured for positioning the carrier line with respect to the deployment apparatus and a tensioning device configured for controlling the tension in the carrier line.

Any such system, wherein the deployment apparatus is configured to redirect the carrier line from an orientation disposed with respect to a vessel above the hydrodynamic body in the water column to a substantially horizontal orientation for deployment of the seismic sensors on a bottom surface below the hydrodynamic body.

Any such system, wherein the deployment apparatus is configured to substantially reduce the tension in the carrier line for deployment of the seismic sensors below the hydrodynamic body, as compared to the tension in the carrier line extending above the hydrodynamic body.

Any such system, wherein the tension is substantially greater than zero in the carrier line extending above the deployment apparatus and the deployment apparatus is configured for the tension to be substantially zero in the carrier line disposed below the deployment apparatus.

Any such system, wherein the deployment apparatus is configured to control the tension in the carrier line to deploy the seismic sensors along the carrier line at a rate substantially faster than free fall velocity of the seismic sensors in the water column.

Any such system, further comprising a control surface coupled to the hydrodynamic body, control surface configured to position the deployment apparatus in the water column with respect to the tow line.

Any such system, wherein the control surface is configured to position the deployment apparatus directly behind or laterally offset from the tow vessel centerline.

Any such system, further comprising a control system configured to steer the deployment apparatus through the water column by actuating the control member.

Any such system, wherein the carrier line engages the deployment apparatus by engaging at least one surface of the hydrodynamic body.

Any such system, wherein the at least one surface defines an aperture extending through the hydrodynamic body, and wherein the carrier line extends through said aperture.

Any such system, wherein the deployment apparatus comprises a deployment mechanism, and wherein the carrier line engages the deployment apparatus by engaging the deployment mechanism.

Any such system, wherein the carrier line tension can be controlled by the surface vessel.

Any such system, wherein the deployment apparatus is capable of communicating with the ocean bottom node.

A method of operating a deployment apparatus according to any of the above examples. A non-transitory computer readable medium having program code stored thereon, the program code executable by a processor to perform such a method.

A method for deploying an ocean bottom data acquisition node from a seismic vessel that is moving at a survey speed according to any of the above examples, comprising: towing a deployment apparatus behind the seismic vessel by a tow line, the deployment apparatus having a hydrodynamic body; adjusting a payout of the tow line to control a position of the deployment apparatus relative to the vessel; deploying a carrier line to the ocean from the seismic vessel and allowing the carrier line to anchor into an ocean floor, wherein the carrier line engages the deployment apparatus such that the tension in the carrier line between the vessel and the sub-sea vessel is non-zero tension, and the tension in the carrier line behind the deployment apparatus is near zero; and deploying the ocean bottom data acquisition node from the seismic vessel by the carrier line, wherein the increased tension of the carrier line increases the rate at which the node falls to the ocean bottom.

Any such method, further comprising adjusting the position of the deployment apparatus to control the location at which the node falls on the ocean bottom.

Any such method, wherein the carrier line engages the deployment apparatus by engaging at least one surface of the hydrodynamic body.

Any such method, wherein the at least one surface defines an aperture extending through the hydrodynamic body, and wherein the carrier line extends through said aperture.

Any such method, wherein the deployment apparatus comprises a deployment mechanism, and wherein the carrier line engages the deployment apparatus by engaging the deployment mechanism.

An ocean-bottom seismic deployment system comprising a tow vessel and a deployment apparatus configured to perform any such method.

A deployment apparatus, comprising: a hydrodynamic body configured to move through a water column; and a wheel or drum provided on the hydrodynamic body, the wheel or drum configured to engage a carrier line having a plurality of seismic nodes distributed therealong; wherein the wheel or drum is configured to apply tension to the carrier line for deployment of the seismic nodes while the hydrodynamic body navigates through the water column.

Any such apparatus, further comprising a tail portion of the hydrodynamic body defining a recess or aperture configured to receive the carrier line in rotating engagement with the wheel or drum.

Any such apparatus, wherein the tail portion is articulated with respect to a forward portion of the hydrodynamic body.

Any such apparatus, further comprising a drive system configured to rotate the wheel or drum to control the tension applied to the carrier line.

Any such apparatus, wherein the hydrodynamic body has a foil configuration with one or more control surfaces configured to navigate the apparatus through the water column.

Any such apparatus, wherein the control surfaces are dynamically adjustable to control a depth and lateral position of the apparatus while navigating through the water column.

What is claimed is:
1. A seismic receiver deployment system comprising:
a deployment apparatus having a hydrodynamic body;
a tow line configured for a tow vessel towing the hydrodynamic body through a water column; and
a carrier line engaged with the deployment apparatus, the carrier line having a plurality of seismic sensors coupled therealong for deployment from the tow vessel;
wherein the deployment apparatus is configured to control tension in the carrier line for deployment of the seismic sensors from the tow vessel to a bottom surface of the water column by way of the carrier line, while the hydrodynamic body is towed through the water column by the tow line.

2. The deployment system of claim 1, wherein the carrier line is coupled to the deployment apparatus by passage through an opening or aperture provided between outer walls of the hydrodynamic body, wherein the carrier line engages the deployment apparatus along at least one surface defining said opening or aperture.

3. The deployment system of claim 2, further comprising a slot extending from the opening or aperture through one of the outer walls, the slot configured for positioning the carrier line into the opening or aperture.

4. The deployment system of claim 1, wherein the deployment mechanism comprises a line positioning member configured for positioning the carrier line with respect to the deployment apparatus.

5. The deployment system of claim 4, wherein the line positioning member is configured to redirect the carrier line from a first orientation defined with respect to the tow vessel coupled to the tow line to a second orientation adapted for deployment of the seismic sensors on the bottom surface of the water column, below the hydrodynamic body.

6. The deployment system of claim 1, further comprising a line tensioning mechanism configured to reduce the tension in the carrier line for deployment of the seismic receivers below the hydrodynamic body, as compared to the tension in the carrier line extending above the hydrodynamic body.

7. The deployment system of claim 6, wherein the line tensioning mechanism comprises a sheave having a drum or wheel component in engagement with the carrier line to reduce the tension for deployment of the seismic sensors to the bottom surface of the water column, disposed below the hydrodynamic body.

8. The deployment system of claim 6, wherein the line tensioning mechanism is configured to control the tension in the carrier line to deploy the seismic sensors at a rate substantially faster than free fall velocity of the seismic sensors in the water column.

9. The system of claim 1, further comprising a control surface configured to position the hydrodynamic body in the water column with respect to a tow vessel coupled to the tow line, the control surface comprising a steerable fairing or foil component.

10. The system of claim 9, further comprising a control system configured for actuating the control surface to position the hydrodynamic body directly behind or laterally offset from a centerline of the tow vessel, wherein the tow vessel is operable at a survey speed of five knots or more.

11. The system of claim 1, further comprising a release mechanism coupled to the hydrodynamic body and configured for deployment of the seismic receivers to a bottom surface of the water column along the carrier line, wherein the release mechanism engages the carrier line to control the tension therein.

12. The system of claim 1, wherein the tension in the carrier line is responsive to control by the tow vessel coupled to the tow line for deployment of the seismic receivers.

13. The system of claim 1, wherein the deployment apparatus is configured to communicate with the seismic nodes to activate recorders or clocks thereon, for operation upon deployment.

14. The system of claim 13, further comprising one or both of a transmitter configured to communicate inductively with the seismic nodes and a line tensioning device configured to communicate with the seismic nodes via tension pulses propagating along the carrier line.

15. A method for deploying seismic nodes, the method comprising:
  towing a deployment apparatus by a tow line coupled to a tow vessel, the deployment apparatus having a hydrodynamic body;
  adjusting a payout of the tow line to control a position of the deployment apparatus relative to the tow vessel;
  deploying a carrier line from the tow vessel to a bottom surface of the water column, wherein the carrier line engages the deployment apparatus to define a tension in the carrier line that is greater between the tow vessel and the deployment apparatus than between the deployment apparatus and the bottom surface; and
  deploying the one or more seismic nodes from the tow vessel to the bottom surface of the water column along the carrier line, while the hydrodynamic body is towed through the water column by the tow line, wherein a deployment rate of the one or more seismic nodes is responsive to the tension in the carrier line.

16. The method of claim 15, wherein the tension in the carrier line is selected to increase the deployment rate with respect to free fall of the one or more seismic nodes through a water column above the bottom surface, absent the tension in the carrier line.

17. The method of claim 15, further comprising adjusting a position of the deployment apparatus with respect to the tow line to control a location at which the one or more seismic nodes are deployed on the bottom surface.

18. The method of claim 15, wherein the carrier line engages the deployment apparatus via at least one surface defining an opening or aperture extending through the hydrodynamic body, the carrier line extending through said opening or aperture.

19. The method of claim 15, wherein the deployment apparatus comprises a node deployment mechanism configured to deploy the one or more seismic nodes to the bottom surface, the carrier line engaging the node deployment mechanism.

20. A seismic node deployment apparatus comprising:
  a hydrodynamic body configured for navigation through a water column having a bottom surface; and
  a sheave mechanism provided on the hydrodynamic body, the sheave mechanism configured to engage a carrier line having a plurality of seismic nodes distributed therealong for deployment from a seismic vessel;
  wherein tension in the carrier line is responsive to operation of the sheave mechanism for deployment of the seismic nodes along the carrier line from the seismic vessel to the bottom surface of the water column by way of the carrier line, during navigation of the hydrodynamic body through the water column.

21. The apparatus of claim 20, further comprising a section of the hydrodynamic body defining a recess or aperture configured to receive the carrier line in rotating engagement with a wheel or drum component of the sheave mechanism.

22. The apparatus of claim 21, wherein the section is articulated to position the carrier line with respect to the hydrodynamic body.

23. The apparatus of claim 20, further comprising a control system configured to modulate the tension in the carrier line by control of the sheave mechanism during deployment of the seismic nodes.

24. The apparatus of claim 20, further comprising a steerable foil system having one or more control surfaces configured for navigation of the hydrodynamic body through the water column.

25. The apparatus of claim 24, further comprising a tow rope coupling the steerable foil system to the hydrodynamic body, wherein the control surfaces are dynamically adjustable to determine a depth or lateral position of the hydrodynamic body with respect to the water column.

* * * * *